(12) United States Patent
Ishiguro et al.

(10) Patent No.: US 7,753,405 B2
(45) Date of Patent: Jul. 13, 2010

(54) AIR BAG SYSTEM

(75) Inventors: Naohiko Ishiguro, Aichi-ken (JP);
Michihisa Asaoka, Aichi-ken (JP);
Hitoshi Iida, Aichi-ken (JP); Kazuaki Bito, Aichi-ken (JP); Yoshiaki Goto, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 273 days.

(21) Appl. No.: 12/010,219

(22) Filed: Jan. 22, 2008

(65) Prior Publication Data

US 2008/0211214 A1     Sep. 4, 2008

(30) Foreign Application Priority Data

Jan. 24, 2007   (JP)   ............... 2007-013869

(51) Int. Cl.
*B60R 21/239* (2006.01)

(52) U.S. Cl. .................... 280/739; 280/743.2

(58) Field of Classification Search ............. 280/739, 280/743.2
See application file for complete search history.

(56) References Cited

U.S. PATENT DOCUMENTS 6,648,371 B2   11/2003  Vendely et al.
7,059,634 B2   6/2006   Bossecker et al.
7,413,218 B2   8/2008   Ekdahl

OTHER PUBLICATIONS

Office Action dated May 7, 2009 from the German Patent Office in the corresponding DE Application No. 10 2008 005 123.3-21 (and English Translation).

*Primary Examiner*—Ruth Ilan
(74) *Attorney, Agent, or Firm*—Posz Law Group, PLC

(57) ABSTRACT

An air bag system of the invention includes an air bag having a discharge port which discharges part of inflation gas when it opens and an opening and closing control unit which enables the control of opening and closing of the discharge port. The air bag includes a bag main body, a discharge portion provided in the bag main body, and a connecting member which is provided within the bag main body and which is connected to the discharge portion on a bottom portion side thereof and connected to the opening and closing control unit on a tip end side thereof. The discharge portion is withdrawn into the bag main body by the connecting member with the connection of the connecting member with the opening and closing control unit maintained, so as to maintain the discharge port in a closed state, while with the connection of the connecting member with the opening and closing control unit canceled, the discharge portion is made to protrude from the bag main body, so as to open the discharge port.

7 Claims, 25 Drawing Sheets

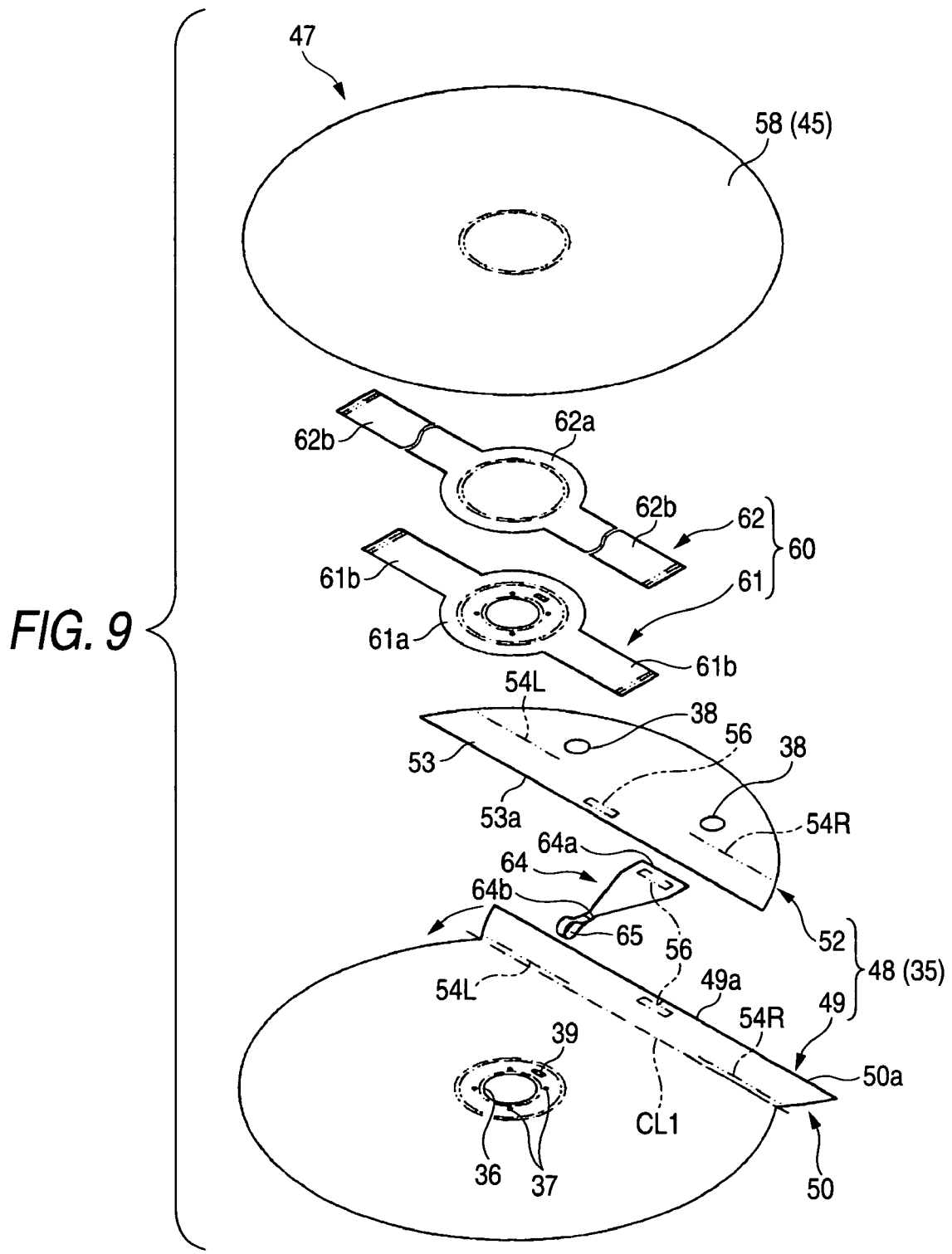

AIR BAG SYSTEM

BACKGROUND OF THE INVENTION

1. Field of the Invention

The present invention relates to an air bag system including an air bag which is adapted to inflate from a folded state resulting when accommodated by introducing an inflation gas thereinto and which is set to enable the suppression of an internal pressure produced when the air bag so inflates.

2. Related Art

In some of conventional air bag systems, a discharge port through which part of inflation gas can be discharged is formed in an air bag, so that an internal pressure produced when the air bag inflates is suppressed by controlling opening and closing of the discharge port by an opening and closing control unit according to a seated position and his or her build of an occupant seated in the seat (refer, for example, to U.S. Pat. No. 6,648,371).

In the conventional air bag system, however, a configuration has been adopted in which a discharge port of a substantially circular opening is provided in a circumferential wall which makes up the air bag, a flap material which is provided separately from the air bag and is of a size which can close the discharge port is securely sewn to a circumferential edge of the discharge port, and a tip end side of the flap material which is spaced away from the sewn portion is connected to an opening and closing control unit, whereby the discharge port is opened or closed by maintaining or canceling the connection with the flap material. Namely, since the conventional air bag system adopts the configuration in which the discharge port bored in the base sheet making up the air bag is made to be closed by the flap material from an outer circumferential side thereof, there has still been left room for improvement in an area where accurate opening and closing of the discharge port is realized while securing good sealing properties.

SUMMARY OF THE INVENTION

The invention has been made to solve the problem, and an object thereof is to provide an air bag system which can enable the accurate opening and closing of a discharge port with a simple configuration and which can control an internal pressure produced within an air bag when it inflates.

With a view to attaining the object, according to an aspect of the invention, there is provided an air bag system comprising:

an air bag accommodated within an accommodating portion; and an opening and closing control unit of a discharge port disposed on the accommodating portion;

wherein the air bag includes a bag main body having an inlet opening, a discharge portion having the discharge port, and a connecting member disposed within the bag main body such that a first end thereof is connected to the discharge portion and a second end thereof is connected to the opening and closing control unit, wherein the air bag is inflated by introducing a gas into an interior of the air bag through the inlet opening and discharges a part of the gas by opening the discharge port;

wherein the bag main body is formed by joining circumferential edges of a plurality of main body base sheets to each other, wherein the discharge portion includes a pair of two extended portions extended from the main body base sheets such that a tip end of at least one of the extended portions is connected to the first end of the connecting member, and a slit for forming the discharge port located at foot portions of the respective extended portions, being formed as a non-joined portion along a seaming line of joining the circumferential edges of the main body base sheets, wherein, when the air bag is accommodated in the accommodating portion, the extended portions are superposed and accommodated in the interior of the air bag, when the air bag is inflated, the slit for the discharge port is closed by maintaining the second end of the connecting member to be connected to the opening and closing control unit, and subsequently, at least a part of the discharge portion protrudes to an exterior of the air bag to thereby cause the slit to be opened to form the discharge port, by releasing connection of the second end of the connecting member to the opening and control unit to cancel a drawing tension of the connecting member to the discharge portion in the interior of the air bag.

In the air bag system of the invention, during the production of the air bag, when the circumferential edges of the two adjacent main body base sheets are joined to each other excluding the location where the extended portions exist, the discharge portion and the discharge port can be formed at the same time as the bag main body is formed. Namely, in the air bag system of the invention, in the event that the circumferential edges of the plurality of main body base sheets which make up the bag main body are joined to each other so as to form the bag main body, not only the discharge portion but also the discharge port can be formed. In addition, in the air bag system of the invention, since the discharge port is made up of the gap (the non-joined portion) which lies between the joined portions made by joining together the circumferential edges of the main body base sheets and where no joining work is performed, an opening which makes up a discharge port does not have to be formed by separately cutting a hole in the base sheets making up the air bag. Due to this, in the air bag system of the invention, an increase in the number of components involved can be suppressed, and additionally, increases in the number of man-hours for production and production cost can be suppressed.

In addition, in the air bag system of the invention, the opening and closing of the discharge port is configured to be controlled by maintaining or canceling the connection of the connecting portion, which is configured to pull the discharge portion to which the bottom portion side thereof is connected into the interior of the bag main body and is connected to the opening and closing control unit at the tip end thereof, with the opening and closing control unit. In the air bag system of the invention, when the air bag inflates with the connection of the connecting member with opening and closing control unit cancelled, the discharge portion which is made to communicate with the bag main body is allowed to protrude from the pulled-in state to the outside of the bag main body to thereby cause the extended portions in the discharge port forming non-joined portion made up of the portion lying between the joined portions to be separated from each other, so as to open the discharge port, whereby the inflation gas is allowed to be discharged from the discharge port so opened. Due to this, there is provided a mode in which the discharge port is caused to naturally open in association with the introduction of the inflation gas into the air bag, whereby the discharge port can be caused to open in a stable fashion so as to allow excess inflation gas to be discharged, thereby making it possible to suppress the internal pressure. In addition, when the air bag inflates with the connection of the connecting member with opening and closing control unit maintained, the bag main body inflates with the discharge portion pulled in the interior of the bag main body by the connecting member. In this case, the extended portions are brought into pressure contact with each other by virtue of the internal pressure produced within the bag main body by the inflation gas that has been introduced thereinto in the discharge portion which is maintained in the pulled-in state by the connecting member which is connected to the opening and closing control unit, and a linear seal portion is formed in the location of the non-joined portion lying between the joined portions in such a manner as to connect end portions of the joined portions to each other, whereby the discharge port can accurately be closed, and the discharge of the inflation gas from the discharge port can be suppressed as much as possible, thereby making it possible to maintain a higher internal pressure. As a result, the discharge port can be opened and closed accurately in association with canceling and maintaining the connection of the connecting member with the opening and closing control unit while securing the sealing properties of the discharge port, thereby making it possible to adjust accurately the internal pressure of the air bag which has completed its inflation.

Consequently, in the air bag system of the invention, the accurate opening and closing of the discharge port can be implemented with the simple configuration, thereby making it possible to control the internal pressure of the air bag when it has completed the inflation.

In addition, in the air bag system of the invention, in the event that a configuration is adopted in which when the air bag has completed its inflation with the discharge portion closed, portions of the main body base sheets making up the bag main body which lie in the vicinity of the discharge portion are disposed in an area which is formed into a shape of curved surface which protrudes towards an outer circumference of an inflated shape defined in a direction which intersects a straight line connecting the joined portions substantially at right angles, since tension applied to the main body base sheets of the bag main body while the internal pressure is in action when the air bag inflates with the discharge port kept open as a result of the discharge portion being released from the pulled-in state acts along a direction in which the discharge port is opened, the opened shape of the discharge port which results when the extended portions are caused to be separated from each other so that the discharge port is opened can be maintained in a stable fashion, thereby making it possible to allow the inflation gas to be discharged from the discharge port in a stable fashion.

Furthermore, in the air bag system of the invention, in the event that a configuration is adopted in which the connecting member is provided one, so that the tip ends of the two extended portions are both connected thereto, a discharge area where the inflation gas is actually discharged from the discharge portion is formed in two locations between the tip end joining portion where the connecting portion is joined to the tip ends of the extended portions which protrude towards the bag main body and the joining portions on the bottom portion sides of the extended portions. Due to this, opened surfaces of the discharge areas where the inflation gas is to be actually discharged from the discharge portion when the air bag inflates with the connection of the connecting member with the opening and closing control unit canceled are formed in such a manner as to intersect an outer circumferential wall portion which protrudes from the bag main body to make up the bag main body substantially at right angles. As a result, for example, even in a configuration in which a rim portion of a steering wheel, an instrument panel which is disposed in front of a front passenger seat, a windshield or the like is provided in the vicinity of the discharge portion, the opened surfaces themselves of the discharge areas are made difficult to be closed by those members, and open areas of the opened surfaces of the discharge areas which result when they are opened preferably become easy to be secured. In addition, in the air bag system that is configured as has been described above, since the discharge portion is formed substantially into the bag-like shape in which the two discharge areas are opened, when the air bag inflates with the connection of the connecting member with the opening and closing control unit canceled, the volume of the air bag is increased by an amount equal to the volume of the discharge portion, thereby making it possible to suppress the internal pressure more accurately.

In addition, in the air bag system of the invention, in the event that a configuration is adopted in which the connecting member is provided two, so that the tip ends of the two extended portions are connected thereto, respectively, the whole of the discharge port which is made up of the non-joined portions lying between the joined portions on the bottom portion sides of the extended portions is opened, whereby the open area of the discharge port which results when it is opened can preferably be secured to a large extent.

Additionally, in the air bag system of the invention, the air bag may be used in an air bag system for a steering wheel, and furthermore, the air bag may be used in a front seat passenger air bag.

BRIEF DESCRIPTION OF THE DRAWINGS

FIG. 9 is a schematic exploded perspective view showing constituent components when the air bag shown in FIG. 6 is produced.

DETAILED DESCRIPTION OF THE PREFERRED EMBODIMENTS

Hereinafter, embodiments of the invention will be described based on the drawings. A steering wheel air bag system M1, which is a first embodiment of the invention, is shown in FIGS. 1 to 12.

In a first embodiment, unless mentioned otherwise, forward and rearward, upward and downward, and leftward and rightward directions are based on the position of a steering wheel W mounted on a vehicle which results when it is steered to drive the vehicle straight ahead, and upward and downward directions along an axis of a steering shaft SS (refer to chain double-dashed lines in FIGS. 3, 4) to which the steering wheel W is assembled are regarded as a vertical direction, forward and rearward directions of the vehicle which are directions intersecting the axis of the steering shaft SS at right angles are regarded as a longitudinal direction, and leftward and rightward directions of the vehicle which are directions intersecting the axis of the steering shaft SS at right angles are regarded as a transverse direction, so as to denote the longitudinal, vertical and transverse direction of the vehicle.

Figure 2:
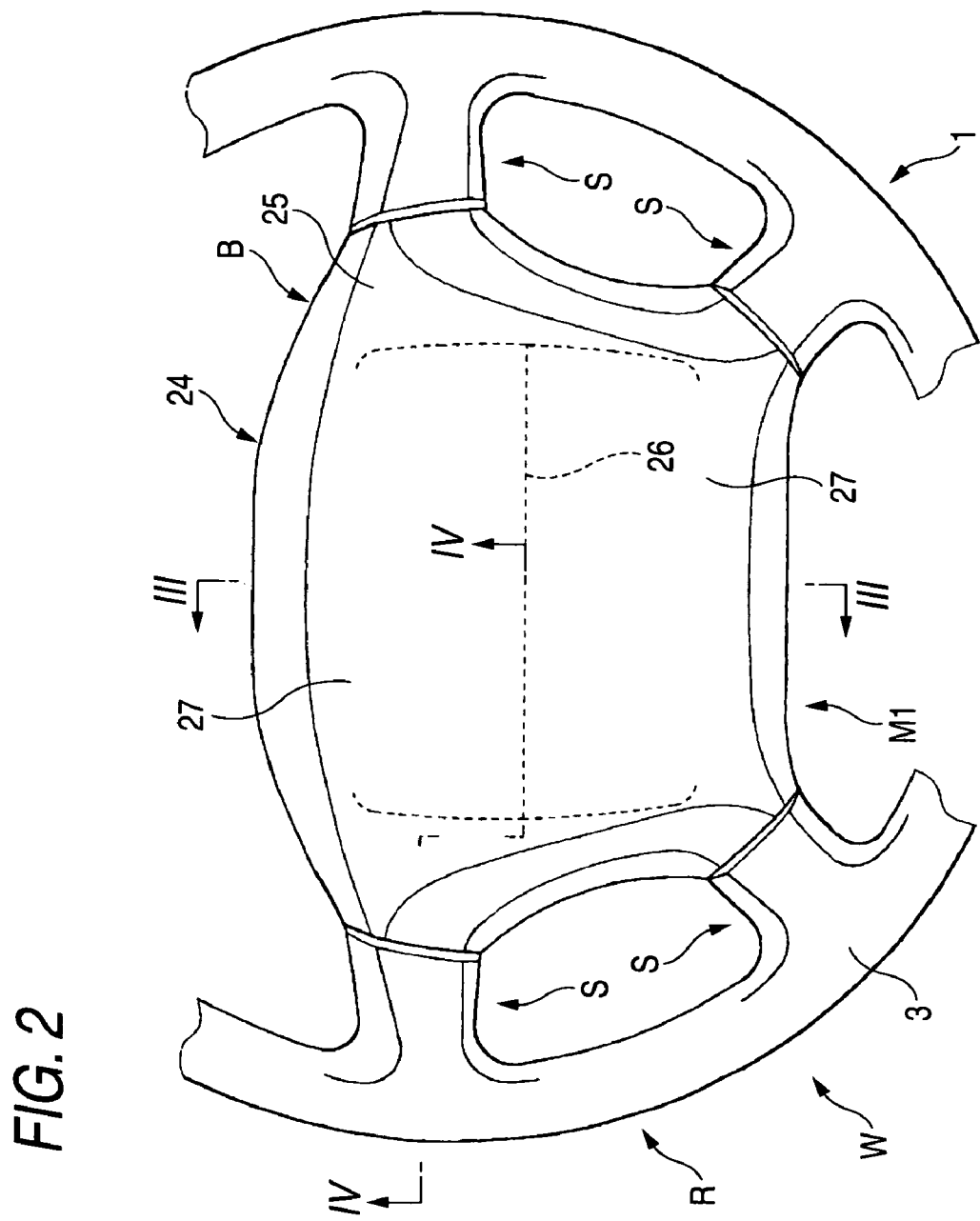
FIG. 2 is a partially enlarged plan view of the steering wheel in which the air bag system of the first embodiment is used.
Figure 3:
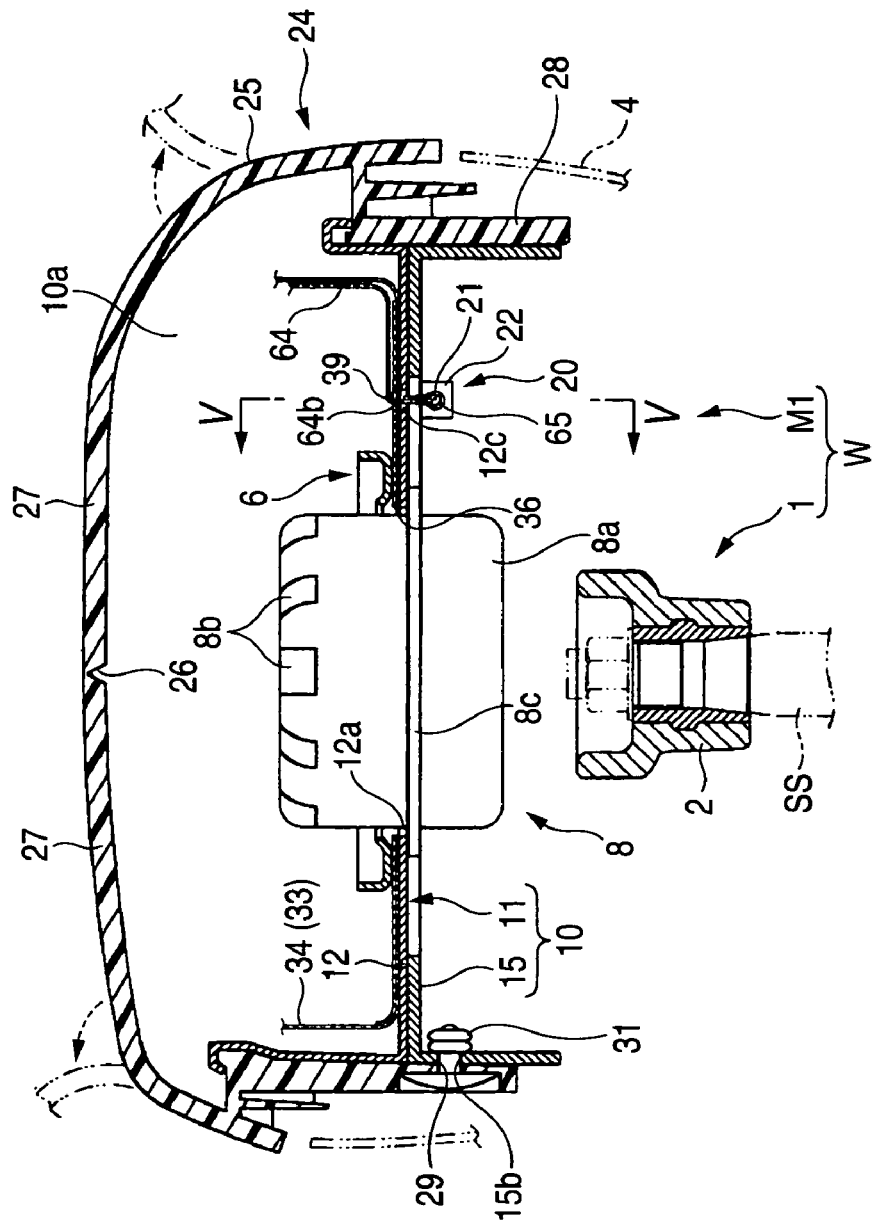
FIG. 3 is a schematic sectional view of the steering wheel of the first embodiment which corresponds to a view taken along the line III-III in FIG. 2.
Figure 4:
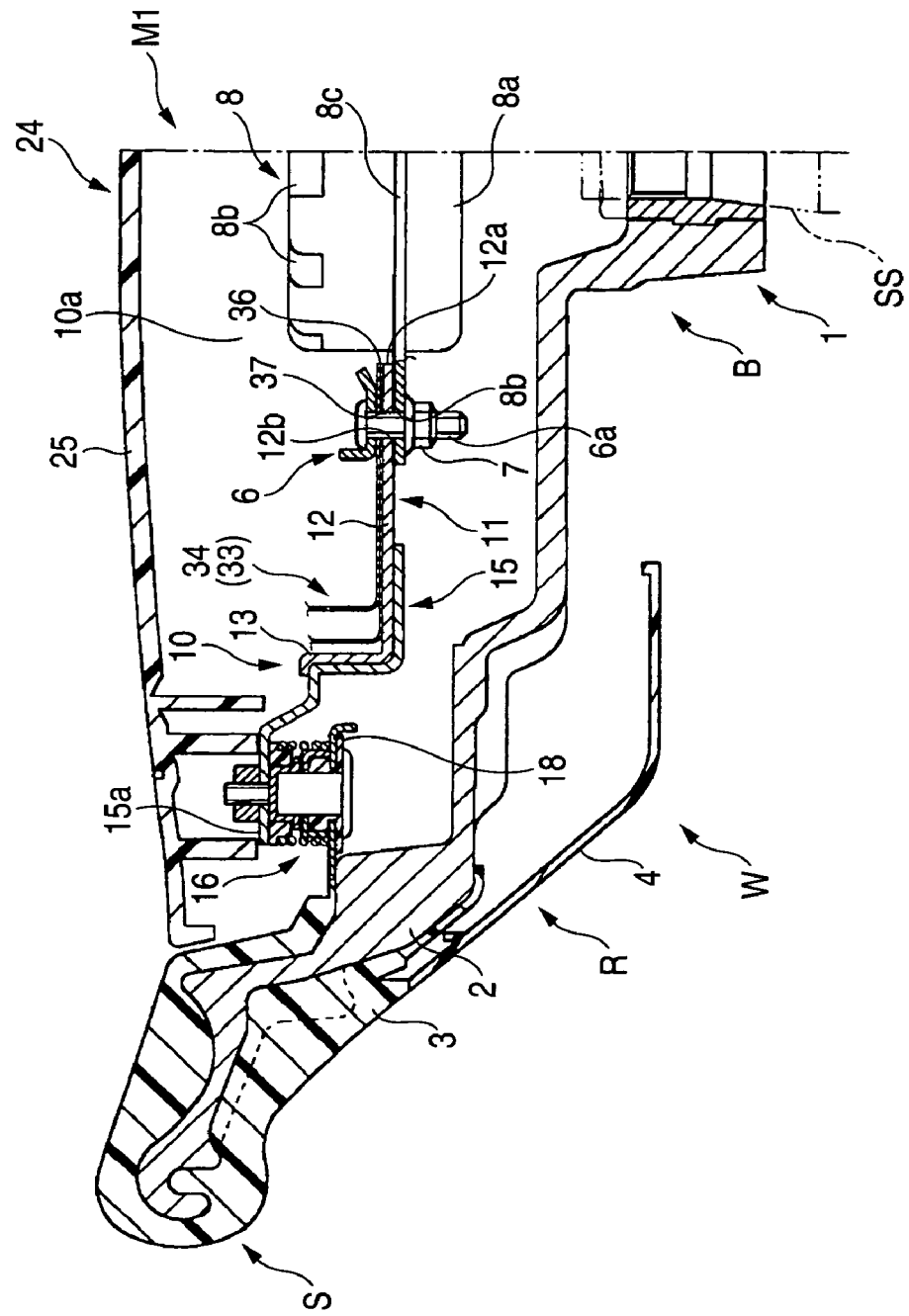
FIG. 4 is a schematic sectional view of the steering wheel of the first embodiment which corresponds to a view taken along the line IV-IV in FIG. 2.

As is shown in FIGS. 2 to 4, the steering wheel W of the embodiment is configured so as to be disposed at an upper portion of a boss portion B which lies in the center of the steering wheel W. The steering wheel W is made up of a rim portion R which is grasped to steer the vehicle, the boss portion B which is disposed in the center of the steering wheel and is connected to the steering shaft SS, and four spoke portions S which connect the boss portion B with the rim portion R. In addition, with respect to constituent components thereof, the steering wheel W is made up of an air bag system M1 and a steering wheel main body 1.

The steering wheel main body 1 is configured to include a metal core 2 of aluminum alloy which is disposed to connect together the respective portions such as the rim portion R, the boss portion B and the spoke portions S, a cover layer 3 of synthetic resin which covers the metal core 2 in the rim portion R and portions of the spoke portions S which lie to face the rim portion R, and a lower cover 4 of synthetic resin which is disposed on a lower side of the boss portion B.

As is shown in FIGS. 3, 4, the air bag system M1 includes a folded air bag 33, an inflator 8 which supplies an inflation gas to the air bag 33, a bag holder 10 which functions as an accommodating portion (a case) which accommodates and holds the air bag 33 and the inflator 8, a pad 24 which functions as an air bag cover which is provided in such a manner as to cover an opening 10a in the bag holder 10, and a locking member 20 which functions as an opening and closing control unit which controls the opening and closing of a discharge port 43 formed in the air bag 33. In the case of this embodiment, operations of the inflator 8 and the locking member 20 are controlled by a control unit 67.

Figure 1:
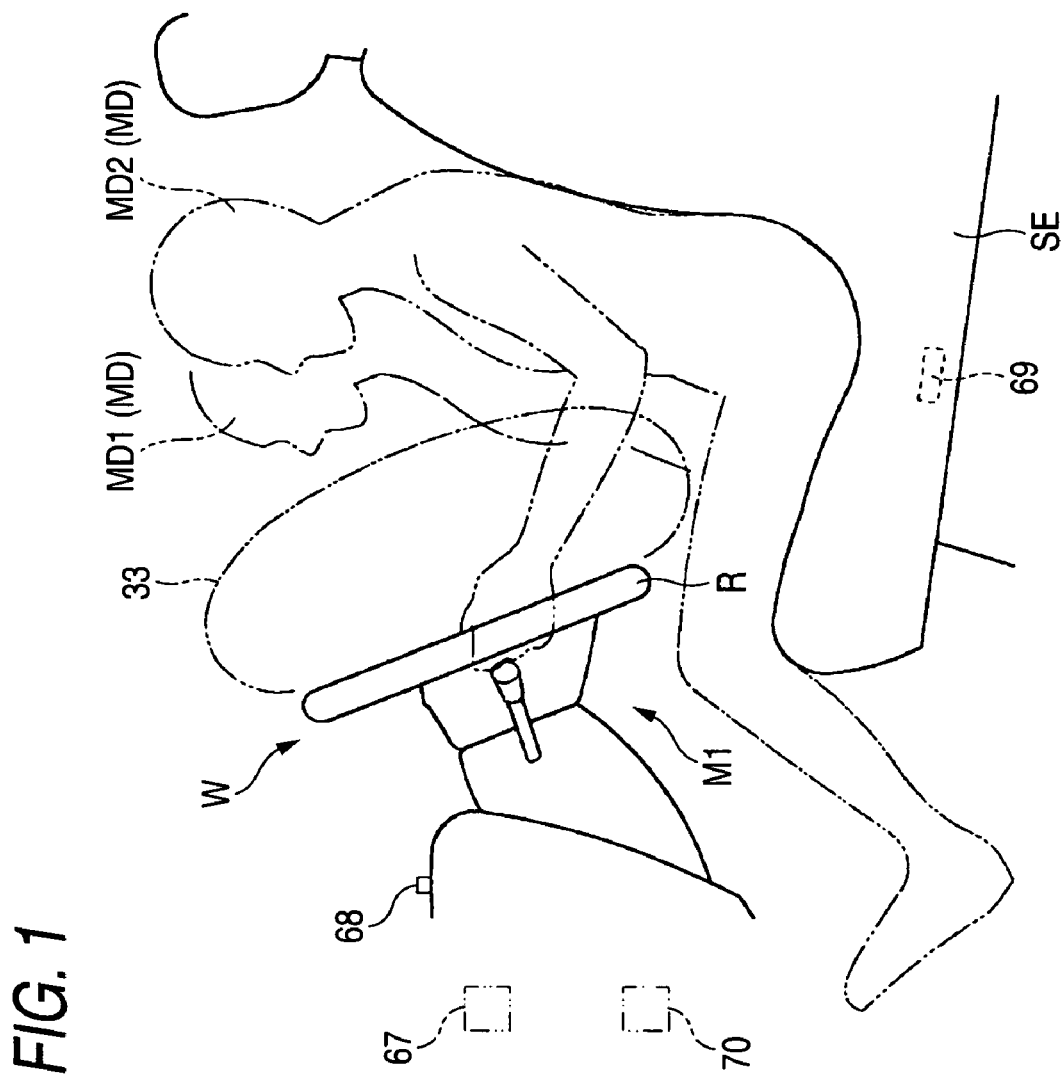
FIG. 1 is a schematic drawing which shows the surroundings of a vehicle steering wheel in which a steering wheel air bag system which is a first embodiment of the invention is installed.

As is shown in FIG. 1, the control unit 67 is electrically connected to a position sensor 68 which functions as an occupant detection sensor which can detect the build of an occupant (the driver) MD seated in a seat SE and a distance between the steering wheel W and the occupant MD, a weight sensor 69 which functions as an occupant detection sensor which can detect the weight of the occupant MD, an collision detection sensor 70 which can detect the acceleration of the vehicle and a direction in which the vehicle is accelerated and the like, so that electric signals from the occupant detection sensors such as the position sensor 68 and the weight sensor 69 or the collision detection sensor 70 and the like are inputted into the control unit 67 not only to activate the inflator 8 but also to control the operation of the locking member 20 functioning as the opening and closing control unit in such a manner as to inflate the air bag 33 in a preferred inflation mode.

The inflator 8 is configured to include a substantially cylindrical main body 8a having in an upper portion a plurality of gas outlet ports 8a from which an inflation gas is discharged and a substantially quadrangular plate-shaped flange portion 8c which is disposed in such a manner as to protrude from an outer circumferential surface of the main body 8a. Passage holes 8d are formed in the flange portion 8c through which bolts 6a protruding from a retainer 6, which will be described later, are passed.

The retainer 6 is, as is shown in FIGS. 3, 4, is made up of a substantially quadrangular ring-shaped metal plate and is configured to have in four corners bolts 6a which protrude downwards therefrom. The retainer 6 causes the respective bolts 6a to protrude from the flange portion 8c of the inflator 8 by way of a circumferential edge of an inlet opening 36 on an inner circumferential surface side of a bag main body 34, which will be described later, of the air bag 33. Then, buts 7 are fastened on to the respective bolts 6a which protrude from the flange portion 8, whereby the air bag 33 and the inflator 8 are mounted in the bag holder 10 by making use of the retainer 6.

As is shown in FIGS. 3, 4, the bag holder 10, which functions as the accommodating portion (the case), is configured to include a holder main body 11 and two holding plates 15, which are each made up of a metal plate.

The holder main body 11 is configured to include a bottom wall portion 12 which is formed into a substantially quadrangular plate shape and a side wall portion 13 which extends upwards from a circumferential edge of the bottom wall portion 12 into a substantially quadrangular tube shape. A through hole 12a is formed in the bottom wall portion 12 in a location lying in the vicinity of the center thereof in such a manner that it opens in a circle so as to allow the main body 8a of the inflator 8 to be passed through from below to above. Four passage holes 12b are formed along a circumferential edge of the passage hole 12a in such a manner that the bolts 6a of the retainer 6 are allowed to be passed therethrough. In addition, a through hole 12c is formed in the bottom wall portion 12 in a location lying in front of the through hole 12a in such a manner that a loop portion 65 formed on a tip end 64b side of a connecting member 64, which will be described later, of the air bag 33 is allowed to be passed therethrough.

Figure 5:
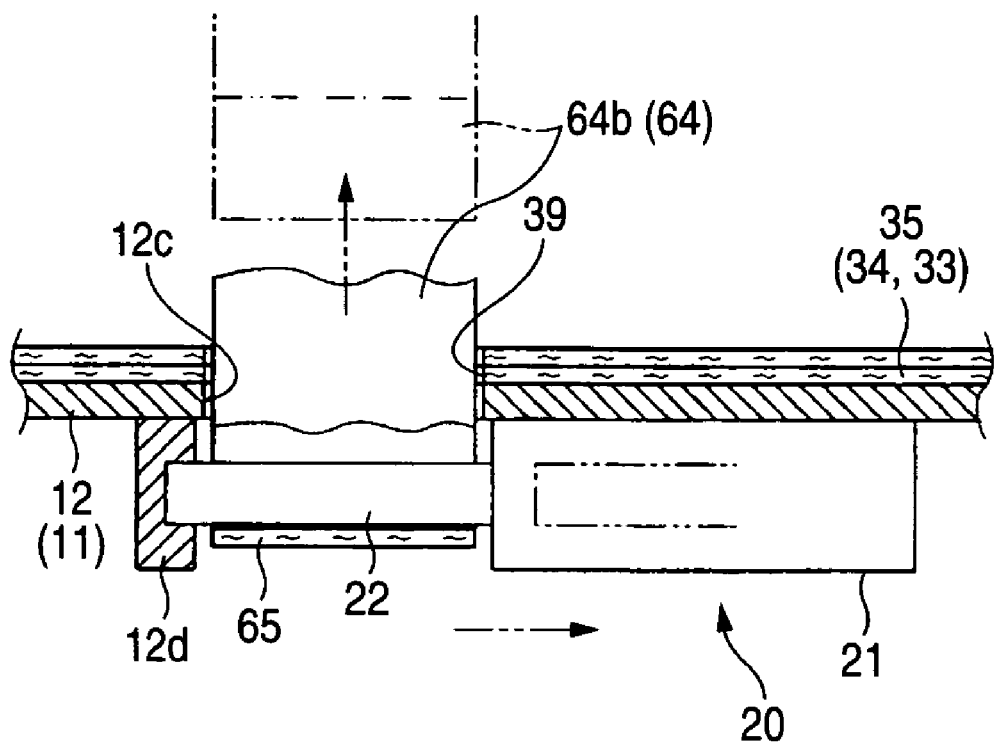
FIG. 5 is a partially enlarged view showing the surroundings of a location where a locking member is provided in the air bag system of the first embodiment.

In addition, the locking member 20, which functions as the opening and closing control unit, is provided on a lower portion side of the bottom wall portion 12 in a position which lies in the vicinity of the through hole 12c. This locking member 20 is made up of a locking pin 21 which is passed through the loop portion 65 which is formed on the tip end 64b side of the connecting member 64 which is provided on the air bag 33 and an actuator which is secured to the lower side of the bottom wall portion 12 and which operates to withdraw the locking pin 21. When the actuator 22 operates to withdraw the locking pin 21, the locking pin 21 is shifted from a state where it locks the loop portion 65 to a state where the lock of the loop portion 65 is cancelled. A piston cylinder which utilizes fluid pressure including hydraulic pressure produced by oil or water, pneumatic pressure, or gas pressure as developed within the inflator, a motor which utilizes the fluid pressures or electricity, an electromagnetic solenoid, a spring which utilizes a biasing force produced when it is restored to its original or natural state or the like can be used for the actuator 22, provided that the locking pin 21 can be shifted by an electric signal from the control unit 67. In addition, as is shown in FIG. 5, a holding piece 12d is provided on the lower side of the bottom wall portion 12 in an edge portion of a circumferential edge of the through hole 12c which faces the actuator 22 in such a manner as to hold a tip end of the locking pin 21 so as to prevent the dislocation of the loop portion 65 from the locking pin 21 when the locking pin 21 locks the loop portion 65.

The holding plate 15 which is secured to the holder main body 11 includes a holding portion 15a which extends as far as near portions of the cover layer 3 which lie on the left- and right-hand side spoke portions S in the vicinity of the rim portion R, and a horn switch 16 is mounted on each holding portion 15a. In addition, in each holding plate 15, mounting holes 15b are formed for passage of rivets 31, which will be described later. In addition, in the case of this embodiment, the air bag system M1 is supported on a connecting plate 18 (refer to FIG. 4) which is fixed to the metal core 2 on lower sides of the horn switches 16 with the horn switches 16 interposed therebetween, whereby the air bag system M1 is mounted on the upper portion of the boss portion B of the steering wheel main body 1.

The pad 24, which functions as the air bag cover, is made of synthetic resin such as an olefin-based thermoplastic elastomer and is, as is shown in FIGS. 2 to 4, configured to include a ceiling wall portion 25 which covers an upper portion side of the boss portion B, a substantially quadrangular tube-shaped side wall portion 28 which extends downwards from an outer circumferential edge of the ceiling wall portion 25. An inner side portion of the side wall portion 28 in the ceiling wall portion 25 is made as a portion which covers the folded air bag 33, and in that portion, a plurality of door portions 27 adapted to be opened when the air bag 33 inflates are provided with breakage prediction portions 26 provided on the periphery thereof. In the case of the embodiment, as is shown in FIG. 2, two door portions 27 are provided in series in the longitudinal direction and are configured such that they are pushed out from the inside by the air bag 33 into which an inflation gas has been introduced so that the breakage prediction portions 26, which are formed into a substantially H shape, are broken so as to allow the door portions 27 to be opened to the front and rear, respectively. A plurality of mounting holes 29 are formed in the side wall portion 28 in such a manner as to pass therethrough in a horizontal direction. Rivets 31, which function as securing means or holding the pad 24 to the bag holder 10, are inserted into these mounting holes 29.

Figure 6:
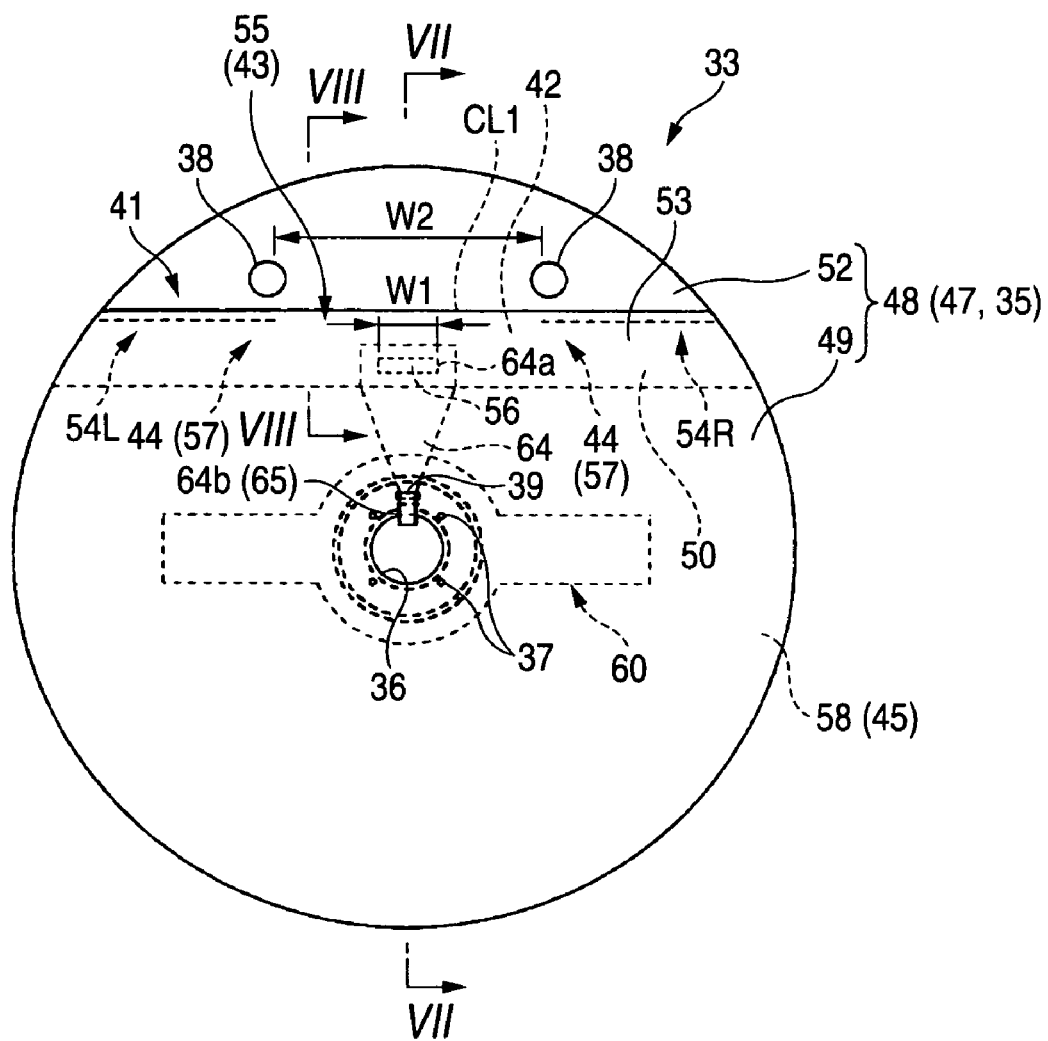
FIG. 6 is a bottom view of an air bag which is used in the air bag system of the first embodiment.
Figure 7:
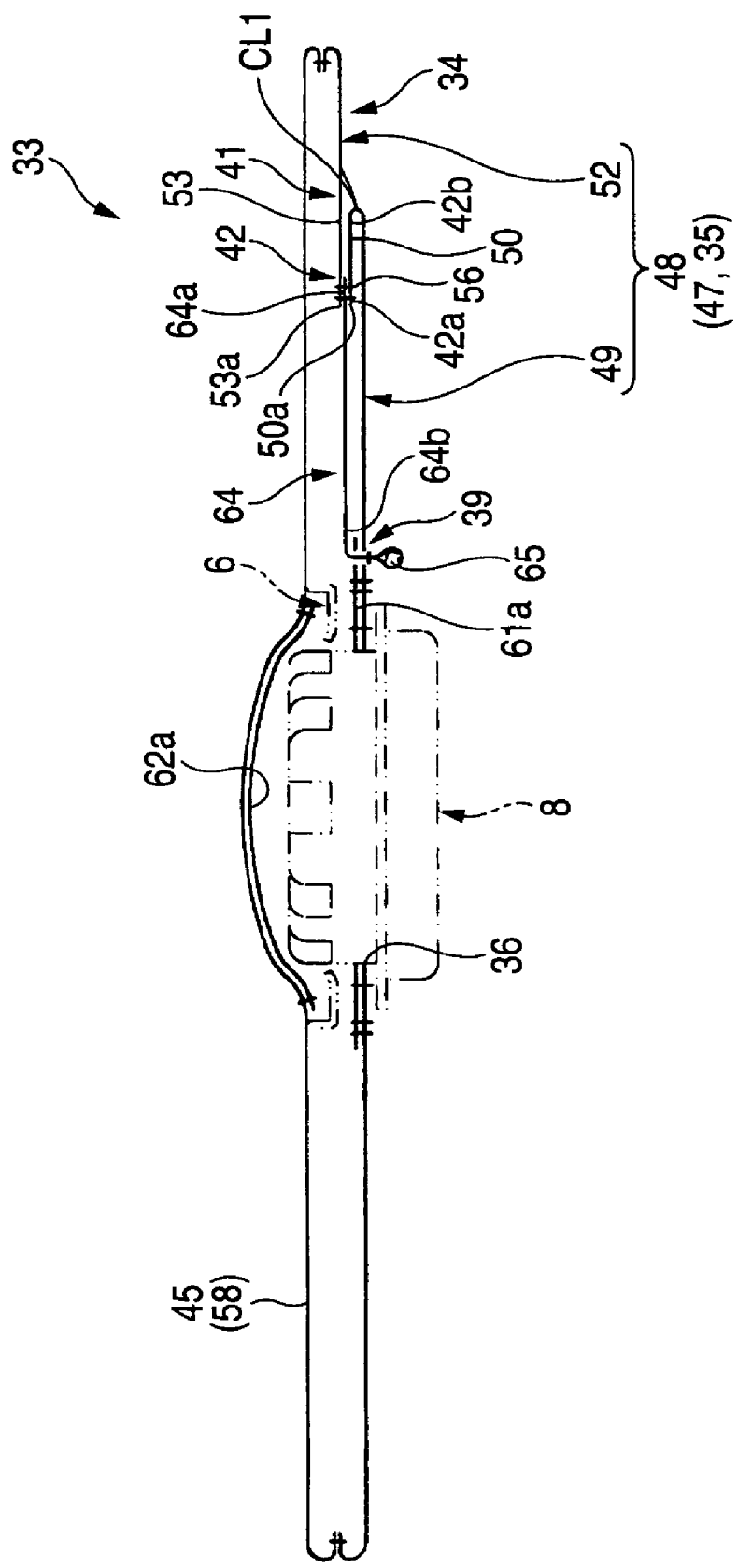
FIG. 7 is a schematic sectional view of the air bag shown in FIG. 6, which corresponds to a view taken along the line VII-VII in FIG. 6.
Figure 8:
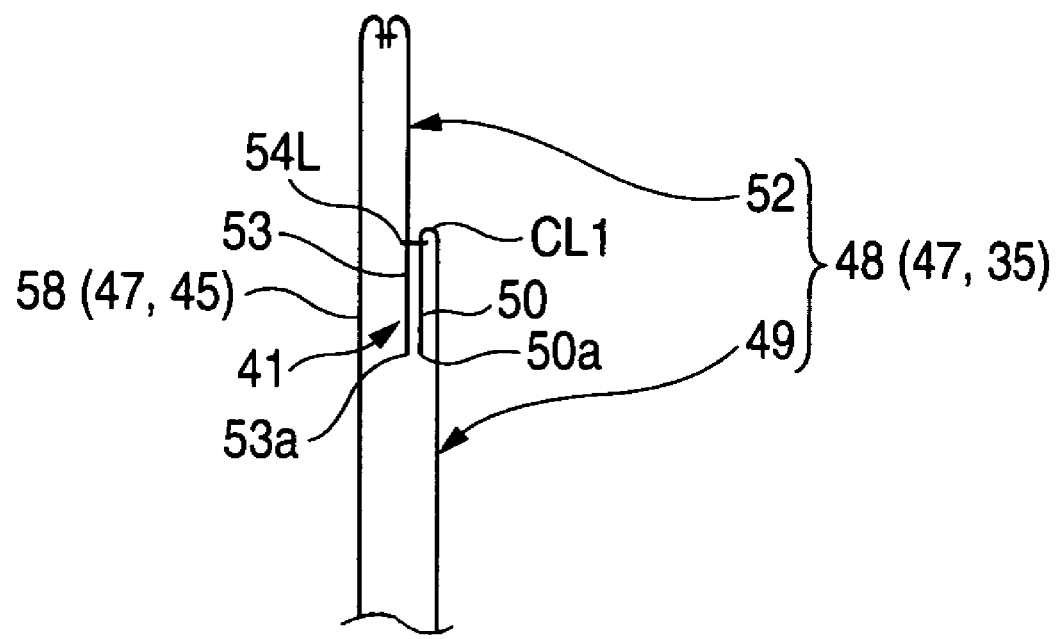
FIG. 8 is a schematic partial sectional view of the air bag in FIG. 6, which corresponds to a view taken along the line VIII-VIII in FIG. 6.

As is shown in FIGS. 6, 7, the air bag 33 is configured to include a bag-shaped bag main body 34 which inflates when the inflation gas is introduced thereinto, a discharge portion 41 which is provided on the bag main body 34, a tether 60 which restricts a shape of the bag main body 34 which results when it has completed its inflation, and a connecting member 64 which is disposed within the bag main body 34 with its bottom portion 64a side connected to the discharge portion 41.

The bag main body 34 is designed to be formed into a disc-like shape which can cover substantially the whole area of an upper side of the steering wheel W when it has completed its inflation, and an outer circumferential wall thereof is formed of a flexible woven fabric which is made of polyamide fibers or polyester fibers. The outer circumferential wall of the bag main body 34 is made up of a body side wall portion 35 which constitutes a steering wheel W side when the bag main body 34 has completed its inflation and has an inlet opening 36 from which the inflation gas is let in and an occupant side wall portion 45 which is disposed in such a manner as to face the inlet opening 36 and which constitutes an occupant (driver) side when the bag main body 34 has completed its inflation.

The inlet opening 36 is configured to be opened into a substantially circular shape somewhere in the center of the body side wall portion 35 and is a portion where the main body 8a of the inflator 8 is inserted from below so that an inflation gas discharged from the gas outlet ports 8b of the inflator 8 is allowed to be introduced into the bag main body 34 therefrom. In addition, four mounting holes 37 are formed along a circumferential of the inlet opening 36 for passage of the bolts 6a formed on the retainer 6, and the air bag 33 (the bag main body 34) is fixed at the circumferential edge of the inlet opening 36 to the bottom wall portion 12 of the bag holder 10 together with the inflator 8 by making use of the retainer 6. In addition, vent holes 38, 38, which are each opened into a substantially circular shape so that an excess portion of the inflation gas that has been introduced into the bag main body 34 can be discharged therefrom, are formed in two locations aligned in the transverse direction in an area which constitutes a front side of the discharge portion 41. In addition, a slit-like passage hole 39 is formed in the vicinity of the center in the transverse direction on a front edge side of the inlet opening 36 in such a manner that the loop portion 65 which is disposed on the tip end 64b side of the connecting member 64 is allowed to be passed therethrough.

In the case of this embodiment, the discharge portion 41 is provided on the body side wall portion 35 and is made up of an external extended portion 50 and an internal extended portion 53 which are formed, respectively, on an opening side base sheet 49 and an outer edge side base sheet 52 which both constitute main body base sheets which will be described later, and is provided in such a manner as to extend along substantially the whole area of the respective base sheets in the transverse direction on a front side of the inlet opening 36. In addition, the discharge portion 41 is configured to include in the vicinity of the center in the transverse direction a protruding portion 42 which protrudes from the bag main body 34 when the air bag 33 inflates with the connection of the connecting member 64 with the locking member (the opening and closing control unit) 20 canceled. In addition, the discharge portion 41 is configured such that tip end edge portions 50a, 53a of the external extended portion 50 and the internal extended portion 53 are left not joined excluding the portion lying in the vicinity of the center in the transverse direction which makes up the protruding portion 42.

The protruding portion 42 is configured such that portions which constitute a tip end 42a side when it protrudes are joined to each other while a bottom portion 42b side is made to communicate with the bag main body 34 when the protruding portion 42 has completed its protrusion and that a bottom portion 64a side of the connecting member 64 is connected thereto. In the case of the embodiment, the communication portion which lies on the bottom portion 42b side of the protruding portion and which is made to communicate with the bag main body 34 is made to constitute a discharge port 43. In addition, in the case of the embodiment, the protruding portion 42 is made to be disposed within the bag main body 34 in such a state that the protruding portion 42 is withdrawn into the bag main body 34 by being pulled by the connecting member 64 with the tip end 42a side oriented to the rear (towards the inlet opening 36) when the air bag 33 inflates with the connection of the connecting member 64 with the locking member 20, which functions as the opening and closing control unit, maintained (refer to FIG. 11A), while when the air bag 33 inflates with the connection of the connecting member with the locking member 20 canceled, the protruding portion is made to be disposed to protrude from the bag main body 34 with the tip end 42a side oriented to the front which is spaced apart from the inlet opening 36 (refer to FIG. 11B). In addition, the protruding portion 42 is designed to be formed into a substantially trapezoidal plate shape whose width dimension is reduced on the tip end 42a side when it has completed its protrusion and to form discharge openings 44, 44 which are made to communicate with the discharge port 43 so as to discharge the inflation gas to the outside of the bag main body 34 on both left and right edge sides thereof when it has completed its protrusion (refer to FIG. 11B).

In addition, in the case of the embodiment, the bag main body 34 and the discharge portion 41 are formed from flexible woven fabrics made of polyamide fibers or polyester fibers and are made by sewing together circumferential edges of a substantially circular body side face fabric 48 which makes up the body side wall portion 35 and a substantially circular occupant side base sheet 58 which makes up the occupant side wall portion 45. In the case of the embodiment, the body side base sheet 48 is formed into a shape which divides the body side wall portion 35 into two along a line which extends substantially along the transverse direction in front of the inlet opening 36 and is made up of two basic fabrics, an opening side base sheet 49 which makes up a portion on the inlet opening 36 side and a outer edge side base sheet 52 which makes up a front portion which is spaced away from the inlet opening 36.

As is shown in FIGS. 6 to 9, the opening side base sheet 49 is a member which constitutes an area from a rear end side of the body side wall portion 35 (the body side base sheet 48) which results when the bag main body inflates to a location which lies to the front of the inlet opening 36 and in the vicinity of the rear of the vent holes 38, 38, in which the inlet opening 36, the mounting holes 37 and the passage holes 39 are provided in the predetermined positions and which is formed such that the whole of the base sheet extends to a front edge 49a side over the whole area in the transverse direction so as to include the external extended portion (an extended portion) 50 which makes up an external portion (a body side portion) of the discharge portion. In the case of this embodiment, the external extended portion 50 is folded back to an inner circumferential side which constitutes an outer edge side base sheet 52 side along a substantially rectilinear fold line CL1 which is formed along the transverse direction in such a manner as to intersect a protruding direction (a vertical direction) of the air bag 33 accommodated in the bag holder 10 substantially at right angles and is shaped such that a fold line CL1 side is narrowed while an edge portion 50a side, which extends along the transverse direction, is widened so as to match the shape of the opening side base sheet 49.

The outer edge side base sheet 52 is a member which makes up a front end area of the body side wall portion 35 (the body side base sheet 48) when the bag main body 34 inflates, in which the vent holes 38, 38 are formed in the predetermined positions, which is formed such that the whole of the base sheet extends to the rear over the whole area in the transverse direction on the inlet opening 36 side which constitutes a rear end side, and which is disposed so as to be superposed on an inner circumferential side of the external extended portion 50 of the opening side base sheet 49 so as to include the internal extended portion (an extended portion) 53 which make up the discharge portion 41. The external extended portion 50 and the internal extended portion 53 are both formed into the same external shape. In addition, in the case of the embodiment, the opening side base sheet 49 and the outer edge side base sheet 52 are made to form a substantially circular external shape in such a state that the inside extended portion 53 is superposed on the inner circumferential side of the external extended portion 50 in such a manner that the edge portion (a rear end side when folded back) 50a of the external extended portion 50 which is folded back along the fold line CL1 is made to coincide with an edge portion 53a which extends along the transverse direction on a rear end side of the internal extended portion 53, so as to be formed into a shape which matches the shape of the occupant side base sheet 58, and make up the body side base sheet.

In the embodiment, the discharge portion 41 is such as to be made up of the portions of the opening side face fabric 49 and the outer edge side base sheet 52 which constitute, respectively, the external extended portion which is folded back to the inner circumferential side and the internal extended portion 53 which is superposed on the inner circumferential side of the external extended portion 50, and is configured to be made by sewing together the external extended portion 50 and the internal extended portion 53 which are superposed on each other by sewn portions (joined portions) 54L, 54R which are provided along the transverse direction in such a manner as to follow substantially along the fold line CL1 in a location on the external extended portion 50 which lies in the vicinity of the fold line CL1. The sewn portions 54L, 54R are formed on both left and right end sides excluding a transverse center. In addition, a non-sewn portion (a non-joined portion) between the sewn portions 54L, 54R is made to constitute the communicating portion on the bottom portion 42b side of the protruding portion 42 which is made to communicate with the bag main body 34, so as to make up the discharge port 43. Namely, in this embodiment, the discharge portion 41 and the discharge port 43 are formed along the transverse direction in such a manner as to intersect the protruding direction (the vertical direction) of the air bag 33 accommodated in the bag holder 10 substantially at right angles.

In the case of the embodiment, the external extended portion 50 and the internal extended portion 53 are sewn to each other by a sewn portion 56 which is formed to extend along the transverse direction in a location which lies near the center in the transverse direction in the vicinity of the edge portions 50a, 53a. This sewn portion 56 is a portion which connects the bottom portion 64a side, which will be described later, of the connecting member 64 to the discharge portion 41, and in the case of the embodiment, the connecting member 64 is sewn together with the external extended portion 50 and the internal extended portion 53 by the sewn portion 56 in such a manner that the bottom portion 64a side is held between the edge portions 50a, 53a of the external extended portion 50 and the internal extended portion 53. In addition, this sewn portion 56 is made to make up the tip end 42a side of the protruding portion 42. In addition, in the case of the embodiment, as is shown in FIG. 6, a transverse width dimension W1 of the sewn portion 56 to which the connecting member 64 is securely sewn is set to be smaller than an open width dimension W2 of the non-sewn portion 55 (slit for discharge port) between the sewn portions 54L, 54R so that the protruding portion is made to protrude smoothly to form the discharge openings 44, 44 smoothly when the connection of the connecting member 64 with the locking member is canceled.

In addition, in the case of the embodiment, portions on the external extended portion 50 and the internal extended portion 53 which extend from the portion between the sewn portions 54L, 54R (the non-sewn portion, or slit 55) to the sewn portion 56 are made to make up the protruding portion 42 on the discharge portion 41. Specifically, the location in the vicinity of the sewn portion 50 to which the bottom portion 64a side of the connecting member is securely sewn is made to make up the tip end 42a side of the protruding portion 42, and the location of the non-sewn portion 55 lying between the sewn portions 54L, 54R is made to make up the bottom portion 42b side of the protruding portion 42. In addition, the location of the non-sewn portion 55 is made to make up the discharge port 43. In addition, in the case of the embodiment, gaps (non-sewn portions 57) where no sewing work is performed are formed on both sides of the sewn portion 56 between the sewn portions 54L, 54R, and spaces defined between the external extended portion 50 and the internal extended portion 53 in these non-sewn portions 57, 57 are made to constitute the discharge openings 44, 44 from which the inflation gas is actually discharged to the outside. Circumferential edges of the discharge openings 44, 44 are each made up of a portion lying in the vicinity of a protruding edge of the external extended portion 50 which protrudes between the sewn portions 54L, 54R and a portion 53b lying in the vicinity of a protruding edge of the internal extended portion 53 (refer to FIG. 11B).

The tether 60 is, as with the bag main body 34, formed of a flexible woven fabric which is made of polyamide fibers or polyester fibers. As is shown in FIG. 10, the tether 60 is such as to restrict a spacing distance between the body side wall portion 35 and the occupant side wall portion 45 when the bag main body 34 has completed its inflation, so as to restrict a shape of the bag main body 34 which results when it has completed its inflation, and is, as is shown in FIG. 9, made up of two tether base sheets 61, 62 which lie to face the body side wall portion 35 and the occupant side wall portion 45, respectively. The respective tether base sheets 61, 62 are made up of connecting portions 61a, 62a which are each formed into a substantially circular shape and are connected to the body side wall portion and the occupant side wall portion 45, respectively, and belt-like extended portions 61b, 62b which are caused to extend from both left- and right-hand side edges of the respective connecting portions 61b, 62b. As is shown in FIG. 9, openings (whose illustrations are omitted) are formed in the connecting portion 61a of the tether base sheet 61 in such a manner as to correspond to the inlet opening 36, the mounting holes 37 and the passage hole 39.

In the case of the embodiment, the connecting member 64 is provided one and is disposed within the bag main body 34 with its longitudinal direction made to follow the longitudinal direction which intersects the fold line CL1 substantially at right angles, in other words, to follow substantially the protruding direction of the air bag 33 which is accommodated in the bag holder 10 or the vertical direction in such a manner that the tip end 64b side extends towards the inlet opening 36. The connecting member 64 is formed separately from the bag main body 34 and is made of a flexible belt-like fabric material. In the case of this embodiment, the connecting member 64 is formed into a tapered shape in which the bottom portion 64a side is widened, while the tip end 64b side is narrowed and is configured to have the loop portion 65 provided on the tip end 64b side thereof through which the locking pin 21 of the locking member 20 can be passed. The connecting member 64 is sewn together with the external extended portion 50 and the internal extended portion 53 by the sewn portion 56 with the bottom portion 64a side held between the edge portions 50a, 53a of the external extended portion 50 and the internal extended portion 53. In addition, the connecting member 64 is provided in the back main body 34 in such a manner as to make its longitudinal direction to follow substantially the longitudinal direction so that the loop portion 65 lying on the tip end 64b side is made to protrude from the passage hole 39 formed in the vicinity of the inlet opening 36 with the bottom portion 64a side sewn to the external extended portion 50 and the internal extended portion 53 in the location of the sewn portion 56. This connecting member 64 is such as to be folded and accommodated together with the bag main body 34, and the locking pin 21 is passed through the loop portion 65, which is provided on the bottom end 64b side when the connecting member 64 is folded and accommodated, so that the loop portion 65 is locked on the locking member 20. In addition, in the case of the embodiment, the connecting member 64 is set to such a length dimension that the air bag 33 is allowed to complete its inflation without any problem even when the air bag 33 inflates in such a manner that the protruding portion 42 of the discharge portion 41 is withdrawn into the bag main body 34 with the connection of the loop portion 65 with the locking pin 21 maintained.

Next, the production of the air bag 33 of the embodiment will be described. Openings (whose illustrations are omitted) which are to constitute the inlet opening 36 are opened in advance in the opening side base sheet 49 of the body side base sheet 48 and the tether base sheet 61. In addition, a connecting portion 62*a* of the tether base sheet 61 is securely sewn in advance to the occupant side base sheet 58, and a connecting portion 61*a* of the tether base sheet 61 is securely sewn in advance to the opening side base sheet 49, as well. Firstly, the opening side base sheet 49 and the outer circumferential edge side base sheet 58 are deployed flat without folding back the external extended portion 50, the external extended portion 50 and the internal extended portion 53 are superposed on each other with the location of the bottom portion 64*a* side of the connecting member 64 interposed therebetween while matching the edge portion 50*a* of the external extended portion 50 and the edge portion 53*a* of the internal extended portion 53 to each other, and the external extended portion 50 and the internal extended portion 53 are sewn together by sewing the locations of the sewn portions 54L, 54R, 56 in a straight line using a sewing yarn. Thereafter, the opening side base sheet 49 is folded back along the location of the fold line CL1, so as to form the substantially circular body side base sheet 48 which faces the occupant side base sheet 58. Then, boring operations are performed on the body side base sheet 48 and the tether base sheet 62 to bore vent holes 38, mounting holes 37 and a passage hole 39. An inlet opening 36 may, of course, be provided during these boring operations, so that no inlet opening 36 is formed before sewing.

Next, the occupant side base sheet 58 and the body side base sheet 48 are superposed on each other in such a manner that external surfaces thereof face each other, and outer circumferential edges of the relevant base sheets are securely sewn to each other. After the outer circumferential edges have been sewn together, the bag main body is turned inside out by making use of the inlet opening 36 in such a manner that a sewing margin along the outer circumferential edge does not appear to an external surface of the air bag 33. In addition, after the bag main body 34 has been so turned over, the extended portions 61*b*, 62*b* of the respective tether base sheets 61, 62 are pulled out from the inlet opening 36, so that tip ends thereof are securely sewn together, whereby the tether 60 can be formed, and at the same time, the air bag 33 can be produced.

Then, the air bag system M1 is assembled by employing the air bag 33 which is formed according to the procedure described above. Firstly, the retainer 6 is inserted into the air bag 33 from the inlet opening 36, the respective bolts 6*a* are caused to protrude from the mounting holes 37, and the air bag 33 is folded up so as to be accommodated within the bag holder 10. As this occurs, the discharge portion 41 is withdrawn into the bag main body 34 in such a state that the external extended portion 50 and the internal extended portion 53 are superposed on each other, and the loop portion 65 lying on the tip end 64*b* side of the connecting member 64 is made to protrude from the passage hole 30 to the outside of the bag main body 34. The discharge portion 41 and the connecting member 64 are made to be folded up together with the bag main body, and even after the air bag 33 has been folded up completely, the loop portion 65 on the tip end 64*b* side of the connecting member 64 is kept protruding from the passage hole 30 to the outside of the bag main body 34. Following this, with the respective bolts 6*a* caused to protrude from the passage holes 12*b* of the bottom wall 12 and the loop portion 65 caused to protrude through hole 12*c*, the folded air bag 33 is accommodated in the bag holder 10 on to which the locking member 20, the horn switches 16 and the connecting plate 18 have already been mounted. Then, the locking pin 21 of the locking member 20 is passed through the loop portion 65 so that the locking pin 21 is held by the holding piece 12*d* on the tip end side thereof, whereby the loop portion 65 is made to be locked on the locking member. Thereafter, the main body 8*a* of the inflator 8 is inserted into the passage hole 12 in the bottom wall portion 12 from therebelow, and the respective bolts 6*a* are made to protrude from the passage holes 8*d* in the flange portion 8*d*. Then, the nuts 7 are fastened on to the respective bolts 6*a*, so that the air bag 33 and the inflator 8 are held to the bag holder 10.

Thereafter, the pad 24 is placed over the air bag 33, and locking pawls 13*a* of the bag holder 10 are locked on stepped portions 28*a* of the side wall portion 28, the bag holder 10 and the side wall portion 28 being fastened together with rivets 31, whereby the air bag system M1 can be assembled.

The air bag system M1 which has been assembled in the way described above can be assembled on to the steering wheel main body 1, which has already been mounted on the vehicle, by connecting the connecting plate 18 to a mounting seat, not shown, of the steering wheel main body 1 by employing predetermined bolts, and as this occurs, the assembling of the steering wheel W and the installation of the steering wheel W on the vehicle are made to be completed. In addition, when the air bag system M1 is assembled on to the vehicle, an operation signal inputting lead wire, not shown, which extends from the control unit 67 is connected to the inflator 8 and the locking member (the opening and closing control unit 20.

In case the vehicle is involved in a collision while it is running after the air bag system M1 according to the first embodiment has been installed on the vehicle, the control unit 67 is made to output an operation signal to the inflator 8, and the inflator 8 causes the inflation gas to be discharged from the gas outlet ports 8*b*, whereby the air bag 33 inflates by allowing the inflation gas to flow thereinto, so that the door portions 27, 27 of the pad 24 are made to open to both the front and rear, and the air bag 33 eventually protrudes towards the occupant MD side and then completes its inflation.

Then, in the air bag system M1 of the first embodiment, when the air bag 33 is produced, the two adjacent opening side base sheet 49 and outer edge side base sheet 52, which constitute the main body base sheets, are sewn together at the locations of the sewn portions 54L, 54R in the vicinity of the fold line CL1 which constitutes the location spaced away from the edge portions 50*a*, 53*a* of the external extended portion 50 and the internal extended portion 53, the discharge portion 41 and the discharge port 43 can be formed at the same time as the bag main body 34 is formed. Namely, in the air bag system M1 of the first embodiment, in the event that the opening side base sheet 49 and the outer edge side base sheet 52, which constitute the plurality of main body base sheets, are sewn together at the locations of 54L, 54R, 56 so as to make up the body side base sheet 48, and that the circumferential edges of the body side base sheet 48 and the occupant side base sheet 58 are joined to each other so as to form the bag main body 34, the discharge portion 41 and the discharge port 43 can be formed. In addition, in the air bag system M1 of the first embodiment, since the discharge port 43 is made up of the portion lying between the sewn portions 54L, 54R on the opening side base sheet 49 and the outer edge side base sheet 52, in other words, the non-sewn portion (the gap) between the sewn portions 54L, 54R where no sewing operation is carried out, an opening which is to make up a discharge port does not have to be formed by separately cutting a hole in the base sheets which make up the air bag 33. Because of this, increases in the number of man-hours for production and production costs can be suppressed.

In the air bag system M1 of the first embodiment, in the event that the body side base sheet 48 which makes up the body side wall portion 35 of the bag main body 34 is simply divided into the opening side base sheet 49 and the outer edge side base sheet 52 and the opening side base sheet 49 and the outer edge side base sheet 52 are then sewn together by sewing the locations of the sewn portions 54L, 54R in a straight line, the discharge portion 41 and the discharge port 43 can be formed, thereby making it possible to produce the discharge portion 41 and the discharge port 43 with ease.

Figure 10A:
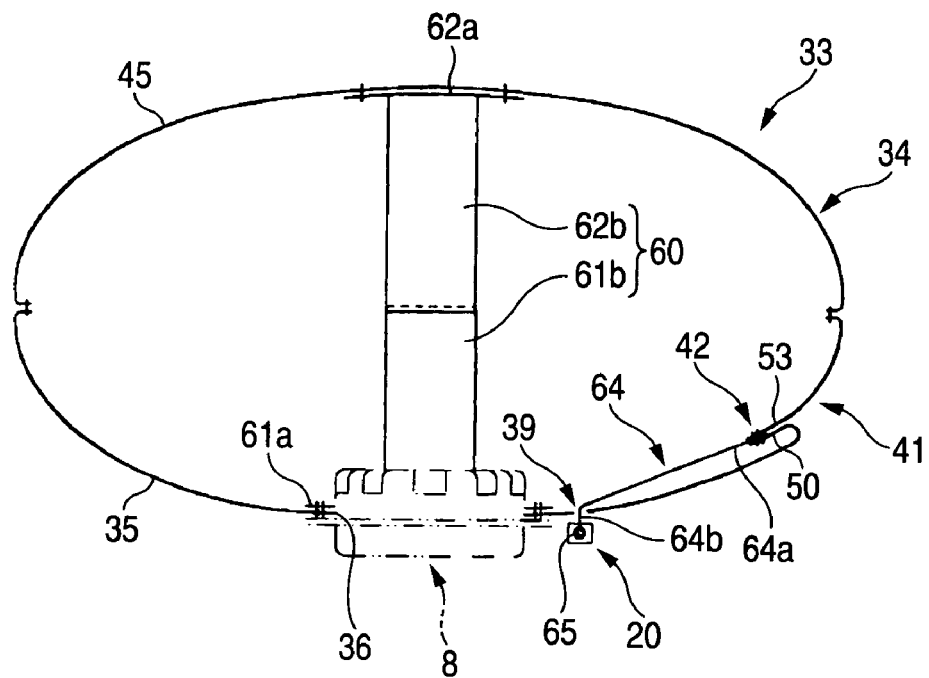
FIG. 10 is a schematic sectional vies which shows a state in which the air bag shown in FIG. 6 has completed its inflation, which is a drawing showing a closed state and an open state of a discharge port.
Figure 10B:
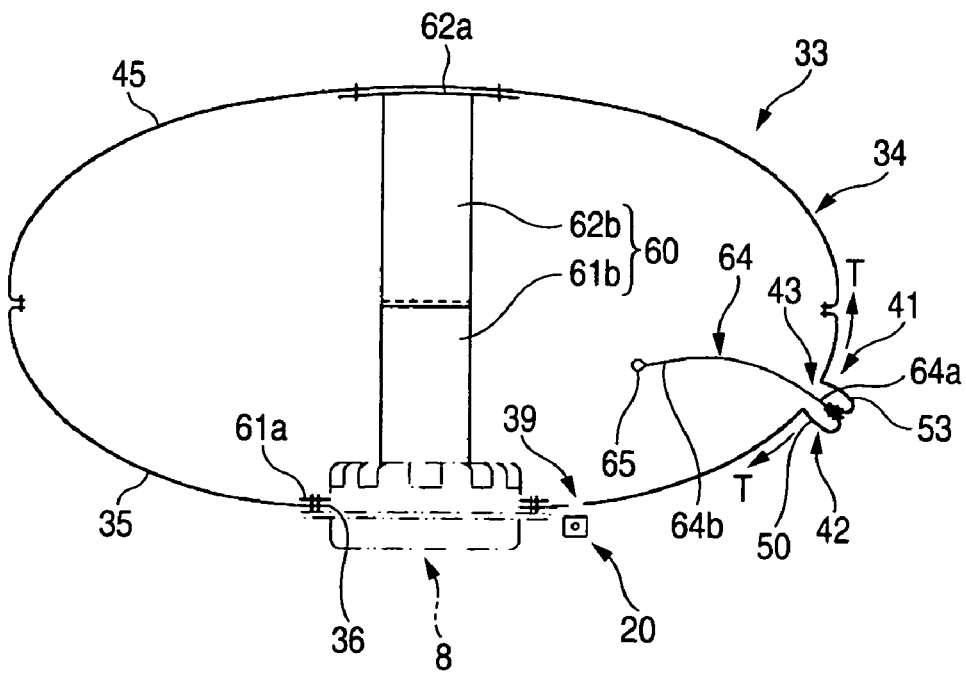
Figure 11A:
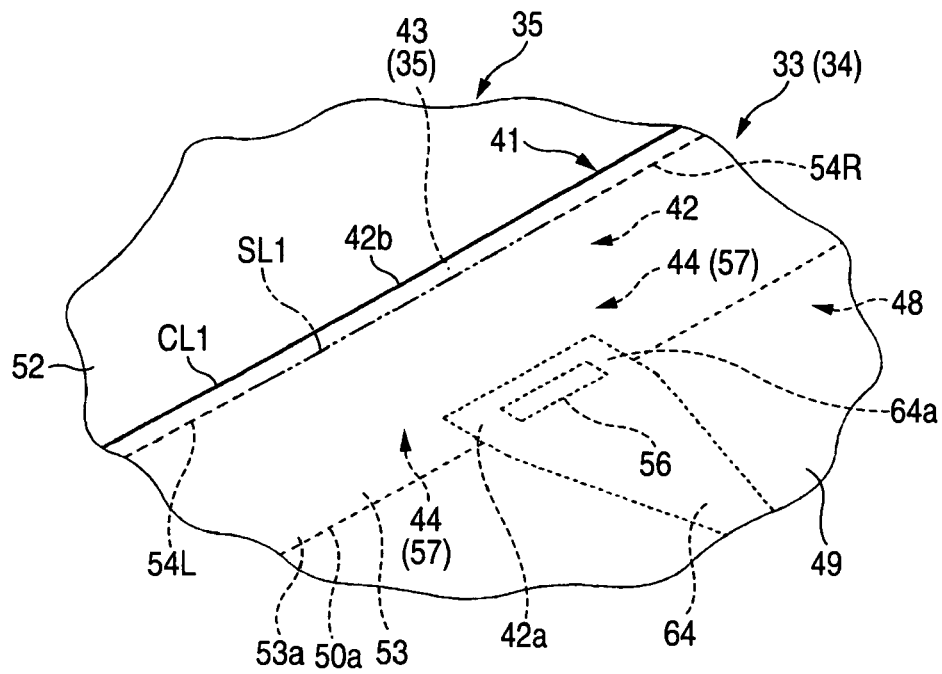
FIGS. 11A and 11B are schematic partially enlarged perspective views showing the discharge portion when it is closed and when it is opened when the air bag shown in FIG. 6 inflates.
Figure 11B:
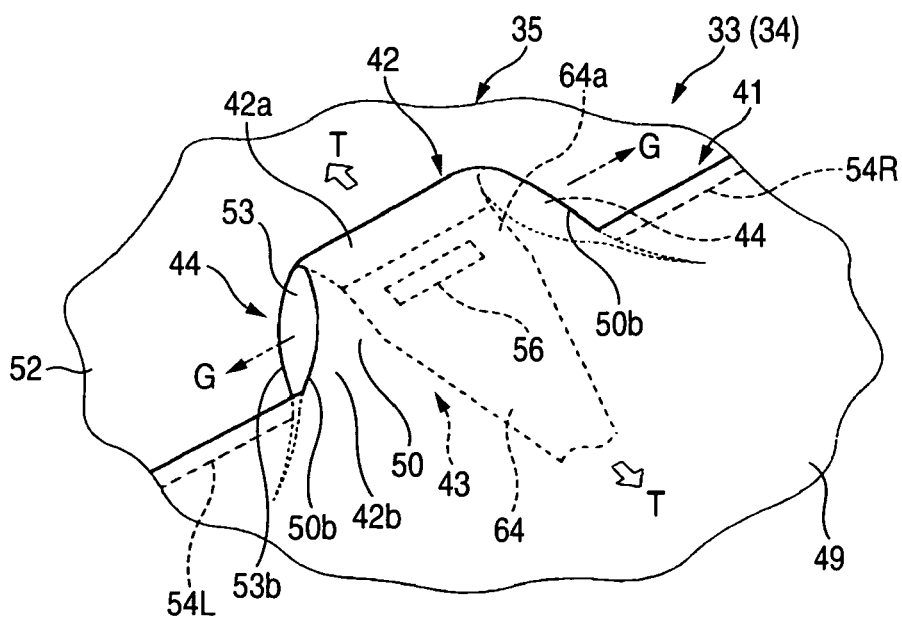
Figure 12:
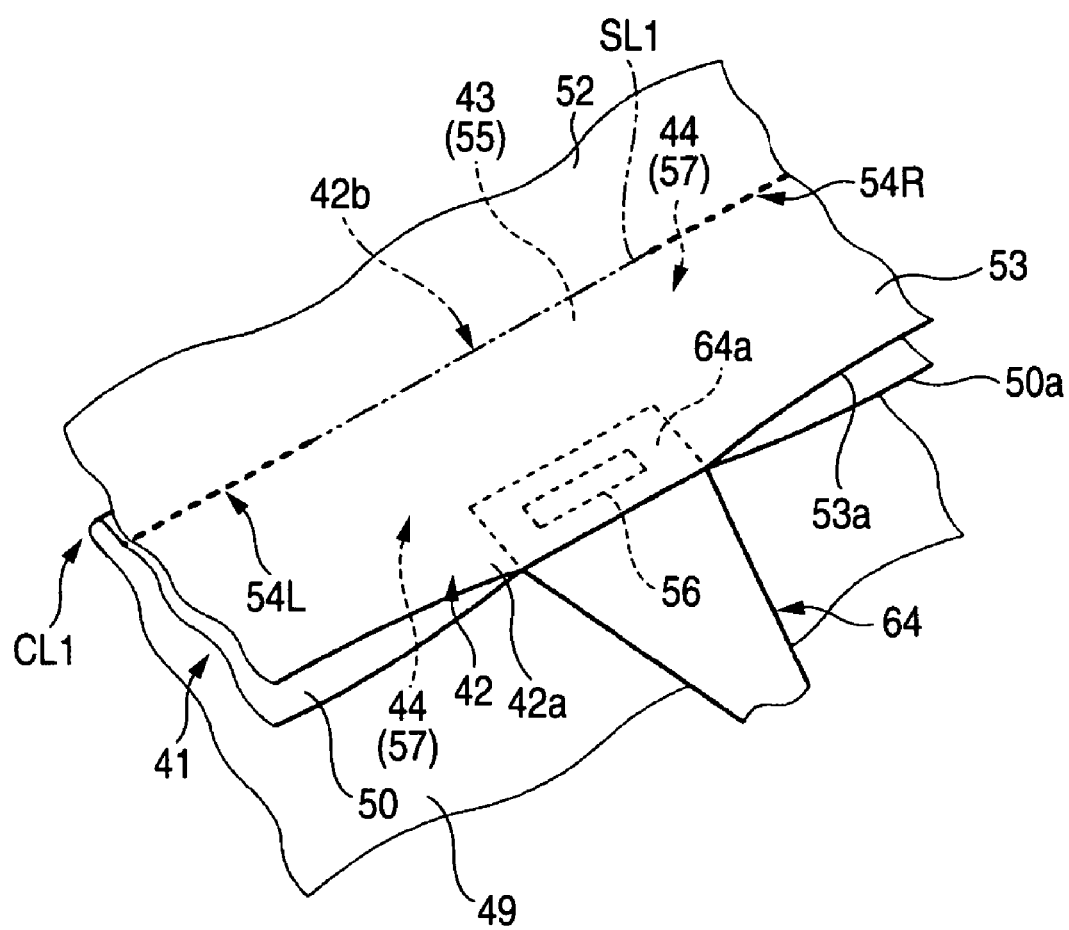
FIG. 12 is a schematic partially enlarged perspective view showing a closed state of the discharge portion as seen from an inner circumferential side of the air bag when the air bag shown in FIG. 6 inflates.

In the air bag system M1 of the first embodiment, the opening and closing of the discharge ports 43, 43 provided in the discharge portion 41 is controlled by maintaining or canceling the connection of the connecting member 64, in which the discharge portion 41 to which the bottom portion 64*a* side thereof is connected is configured to be withdrawn into the bag main body 34 and the tip end 64*b* side thereof is connected to the locking member (the opening and closing control unit) 20, with the locking member 20. Specifically, in the air bag system M1 of the first embodiment, when the control unit 67, into which signals are to be inputted from the predetermined sensors 68, 69, 70, detects that, for example, an occupant MD1 of a small build is seated in the seat, after the inflation gas is discharged from the inflator 8 and the air bag 33 is about to complete its inflation, the control unit 67 outputs an operation signal to the actuator 22 to operate to withdraw the locking pin 21 of the locking member 20, so that the air bag 33 is made to complete its inflation with the lock state resulting between the loop 65, which is formed on the tip end 64*b* side of the connecting member 64, and the locking pin 21 canceled. As this occurs, since the lock of the loop portion 65 by the locking pin 21 is made to be canceled, the state where the protruding portion 42 is withdrawn in the discharge portion 41 is canceled, whereby as is shown in FIGS. 10B and 11B, in the location of the non-sewn portion 55 which is made up the location between the sewn portions 54L, 54R, the external extended portion 50 and the internal extended portion 53 are separated from each other, so as to form the discharge port 43, this allowing the protruding portion 42 to protrude from the discharge port 43 so formed to the outside of the bag main body 34. In addition, the locations of the gaps on the protruding portion 43 which are formed on the left and right sides of the sewn portion 56 between the sewn portion 56 and the sewn portions 54L, 54R are caused to open in such a manner that the external extended portion 50 and the internal extended portion 53 are spaced apart from each other, whereby the discharge openings 44, 44 are made to open largely. Then, the inflation gas G is discharged from the discharge openings 44, 44 so opened.

Because of this, in the air bag system M1 of the first embodiment, with the connection of the connecting member 64 with the locking member 20 canceled, in association with the inflation gas flowing into the interior of the bag main body 34, a mode is produced where the external extended portion and the internal extended portion 53 are made to be spaced apart from each other in the location of the non-sewn portion 55, so as to cause the discharge port 43 to open in such a way that it opens naturally, whereby the discharge port 43 and the discharge openings 44, 44 can be made to be opened in a stable fashion, so that an excess portion of the inflation gas is discharged from the discharge openings 44, 44, thereby making it possible to suppress the internal pressure. As a result, the occupant MD1 with a small build can securely be protected by the air bag 33 which has completed its inflation without pressing him or her more than required (refer to FIG. 1).

On the contrary, when the control unit 67 detects that an occupant MD2 of a large build is seated in the seat or that the occupant is seated in a position which is apart further from the steering wheel W than his or her normal seating position, no operation signal is outputted from the control unit 67 to the actuator 22, whereby the air bag 33 is made to complete its inflation with the lock of the loop portion 65 formed on the tip end 64*b* side of the connecting member 64 by the locking pin 21 maintained. As this occurs, the bag main body 34 is made to inflate with the protruding portion 42 of the discharge portion 41 withdrawn in the bag main body 34 by the connecting member 64 (refer to FIGS. 10A and 11A). As this occurs, in the discharge portion 41 where the protruding portion 42 is kept withdrawn by the connecting member 64 which is connected to the locking member 20, the external extended portion 50 and the internal extended portion 53 are brought into pressure contact with each other by virtue of the internal pressure produced by the inflation gas which is allowed to flow into the bag main body 34, so as to form the linear seal portion SL1 which connects in a straight line the adjacent end portions of the sewn portions 54L, 54R (refer to FIG. 12). Namely, since the external extended portion 50 and the internal extended portion 53 are brought into pressure contact with each other to thereby form the linear seal portion SL1 which seals the non-sewn portion 55 (the discharge port 43), the discharge port 43 can be closed accurately, whereby the discharge of inflation gas from the discharge openings 44, 44 can be suppressed as much as possible, thereby making it possible to maintain a high internal pressure. Due to this, the air bag 33 can be made to complete its inflation with good cushioning properties while securing a sufficient internal pressure, whereby, for example, the occupant who is seated apart from the steering wheel or the occupant MD2 of a large build can securely be protected while suppressing the bottom-out of the air bag 33, thereby making it possible to adjust the internal pressure of the air bag 33 which has completed its inflation in an accurate fashion.

Consequently, in the air bag system M1 of the first embodiment, the opening and closing of the discharge port 43 can accurately be controlled with the simple configuration, thereby making it possible to control the internal pressure of the air bag 33 when it has completed its inflation.

In addition, in the air bag system M1 of the first embodiment, the discharge portion 41 is formed on the body side wall portion 35 side of the bag main body 34 which inflates into the substantially disc shape when it completes its inflation. Namely, in the air bag system M1 of the first embodiment, the location of the discharge portion 41 is made to be disposed in a curved surface area which protrudes an outer circumferential side of the bag main body 34 in a longitudinal section which intersects a straight line which follows the transverse direction while connecting the sewn portions 54L, 54R in a straight line substantially at right angles when the air bag 33 has completed its inflation with the discharge portion 41 kept closed (refer to FIG. 10A). In other words, in the air bag 33, in the air bag system M1 of the first embodiment, in a section which intersects the non-sewn portion 55 which makes up the discharge port 43, that is, the linear seal portion SL1 which connects the sewn portions 54L, 54R in a straight line substantially at right angles, the location of the body side wall portion 35 which is disposed on the periphery of the linear seal portion SL1 is formed into a curved surface shape which protrudes to the outer circumferential side. Because of this, in the air bag system M1 of the first embodiment, when the air bag 33 inflates in such a state that the withdrawal of the discharge portion 41 is canceled so that the discharge port 43 is opened, since tension T (refer to FIGS. 10B and 11) acting on the opening side base sheet 49 and the outer edge side base sheet 52 which make up the bag main body 33 while the internal pressure is in action acts along a direction in which the discharge port 43 is made to open, the discharge port 43 can maintain stably the open shape which results when the external extended portion 50 and the internal extended portion 53 are made to be spaced apart from each other to form an opening so that the discharge port 43 is made to open naturally, thereby making it possible to discharge the inflation gas G from the discharge openings 44, 44 (the discharge port 43) in a stable fashion.

Furthermore, in the air bag system M1 of the first embodiment, the connecting member 64 is provided one, so that the edge portions (the tip ends) 50a, 53a of the two external extended portion 50 and internal extended portion 53 are both securely sewn to the bottom portion 64a side of the connecting member 64. Due to this, the discharge area is made to be made up of the two discharge portions 44, 44 which are formed between the sewn portion 56 (the tip end side joined portion) where the connecting member 64 is sewn at the edge portions (the tip ends) 50a, 53a of the external extended portion 50 and the internal extended portion and the bottom portion side sewn portions 54L, 54R where the external extended portion 50 and the internal extended portion 53 are securely sewn to each other. Due to this, when the air bag 33 inflates with the connection of the connecting member 64 with the locking member 20 canceled to thereby form the discharge port 43, the open surfaces of the discharge openings 44, 44 where the inflation gas is actually discharged from the discharge portion 41 are formed in such a manner as to intersect the body side wall portion 35 as the outer circumferential wall which protrudes from the bag main body 34 to make up the bag main body 34 at substantially right angles (refer to FIG. 11B) As a result, for example, even in the configuration where the rim portion R of the steering wheel W is provided in the vicinity of the discharge portion 41, the open surfaces themselves of the discharge openings 44, 44 are made difficult to be closed by the relevant component, whereby the open area resulting when they open can preferably secured in a stable fashion with ease. In addition, in the air bag system M1 of the first embodiment, when the air bag 33 inflates with the connection of the connecting member 64 with the locking member 20 canceled, as is shown FIG. 11B, the discharge portion 41 is formed substantially into the bag-like shape with the two discharge openings 44, 44 kept opened, and therefore, the volume of the air bag 33 is increased by an amount equal to the volume of the discharge portion 41, thereby making it possible to suppress further the internal pressure.

Figure 13:
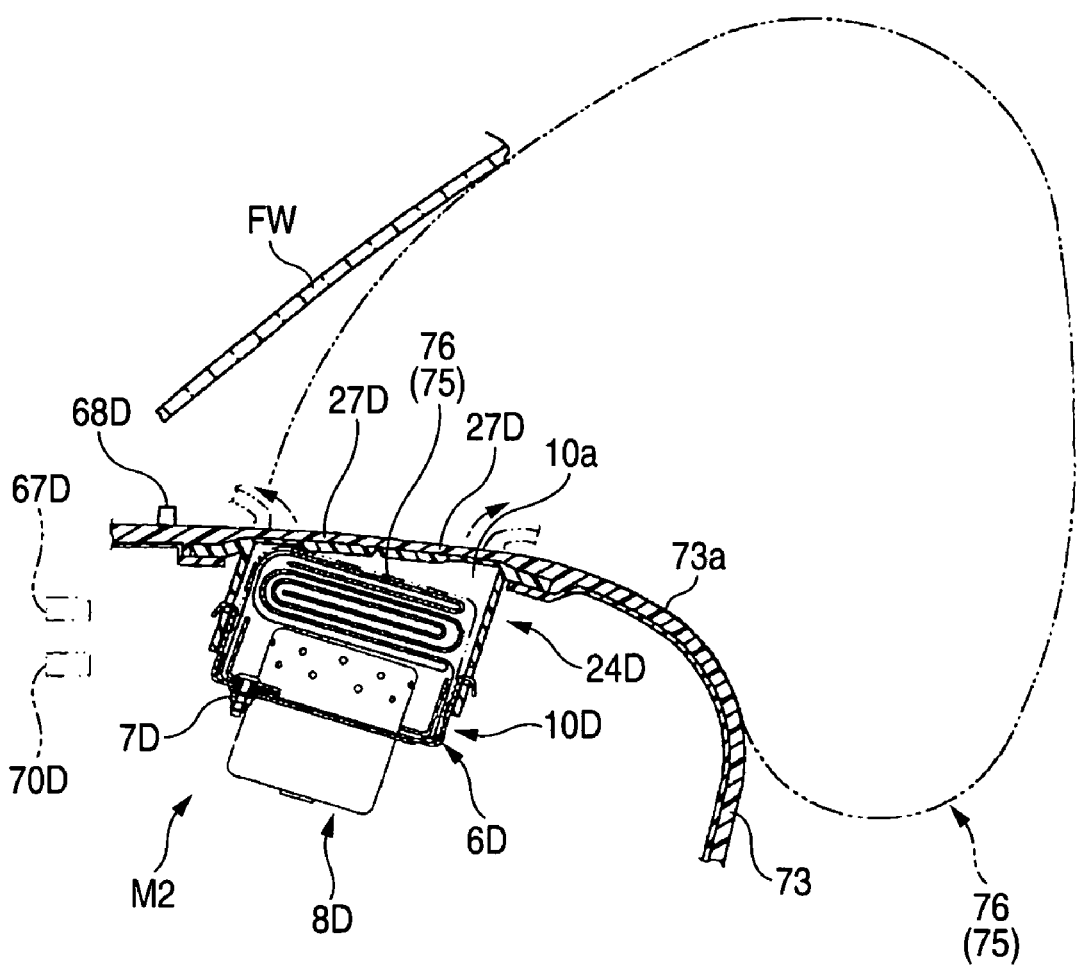
FIG. 13 is a schematic sectional view taken along a longitudinal direction of a vehicle which shows a state in which a front seat passenger air bag system of a second embodiment of the invention is installed in the vehicle.
Figure 14:
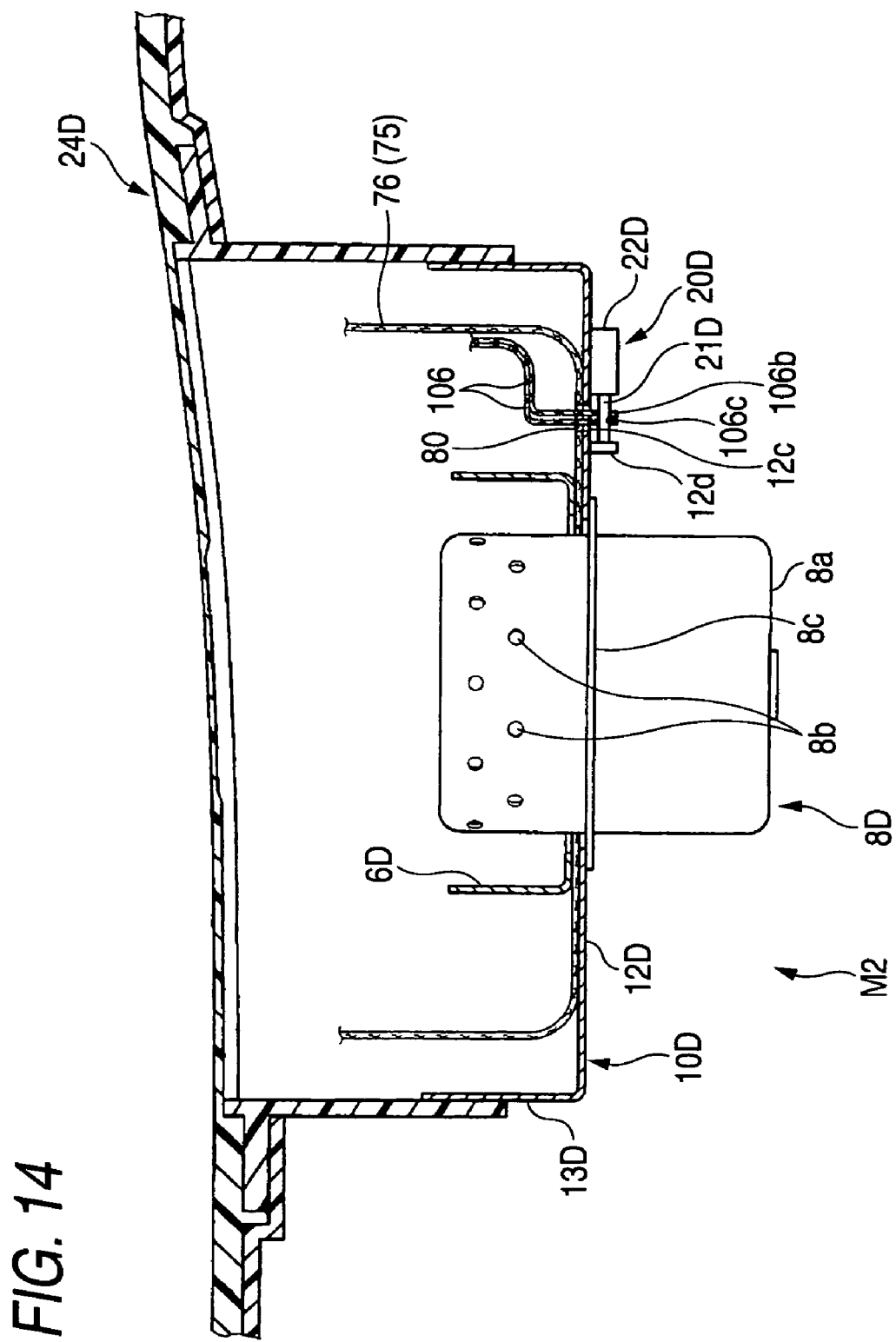
FIG. 14 is a schematic sectional view taken along a transverse direction of the vehicle which shows a state in which the front seat passenger air bag system of the second embodiment is installed in the vehicle.

Next, a front seat passenger air bag system M2 which is a second embodiment of the invention will be described. As is shown in FIG. 13, a front seat passenger air bag system M2 is such as to be disposed on an upper surface 73a side of an instrument panel 73 lying in front of a front passenger seat, and includes, as is shown in FIGS. 13, 14, a folded air bag 75, an inflator 8D which supplies an inflation gas to the air bag 75, a case 10D which functions as an accommodating portion which accommodates and holds the air bag 75 and the inflator 8D, a retainer 6D which attaches the air bag 75 and the inflator 8D to the case 10, an air bag cover 24D which is provided to cover the case 10D, and a locking member 20D which functions as an opening and closing control unit which controls the opening and closing of a discharge port 88 which is formed in the air bag 75. The constituent components which constitutes the front seat passenger air bag system M2 of the second embodiment are configured the same as those which constitute the air bag system M1 excluding the air bag 75 in every point except that shapes are slightly different therebetween. Because of this, like reference numerals with "D" given to the ends thereof are imparted to those like components excluding the air bag 75, and the description thereof will be omitted here. Also in the air bag system M2 of the second embodiment, as is shown in FIG. 13, operations of the inflator 8D and the locking member 20D are configured to be controlled by a control unit 67D which is electrically connected to a position detection sensor 68D, a weight sensor, not shown, a collision detection sensor 70D and the like. In addition, in the air bag system M2 of the second embodiment, the air bag cover 24 is made integral with the instrument panel 73.

Figure 15:
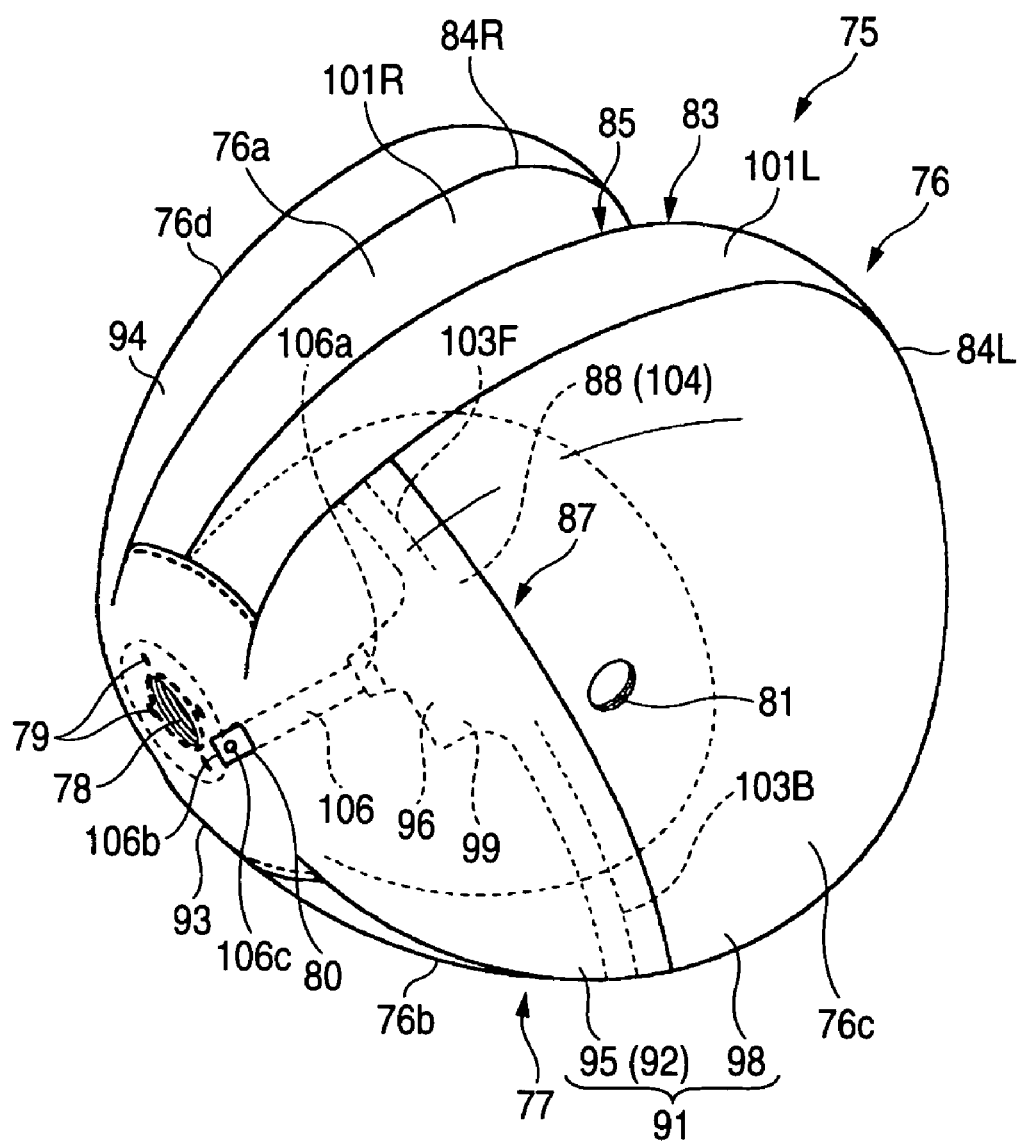
FIG. 15 is a perspective view showing a state in which an air bag is inflated alone which is used in the air bag system of the second embodiment.
Figure 16:
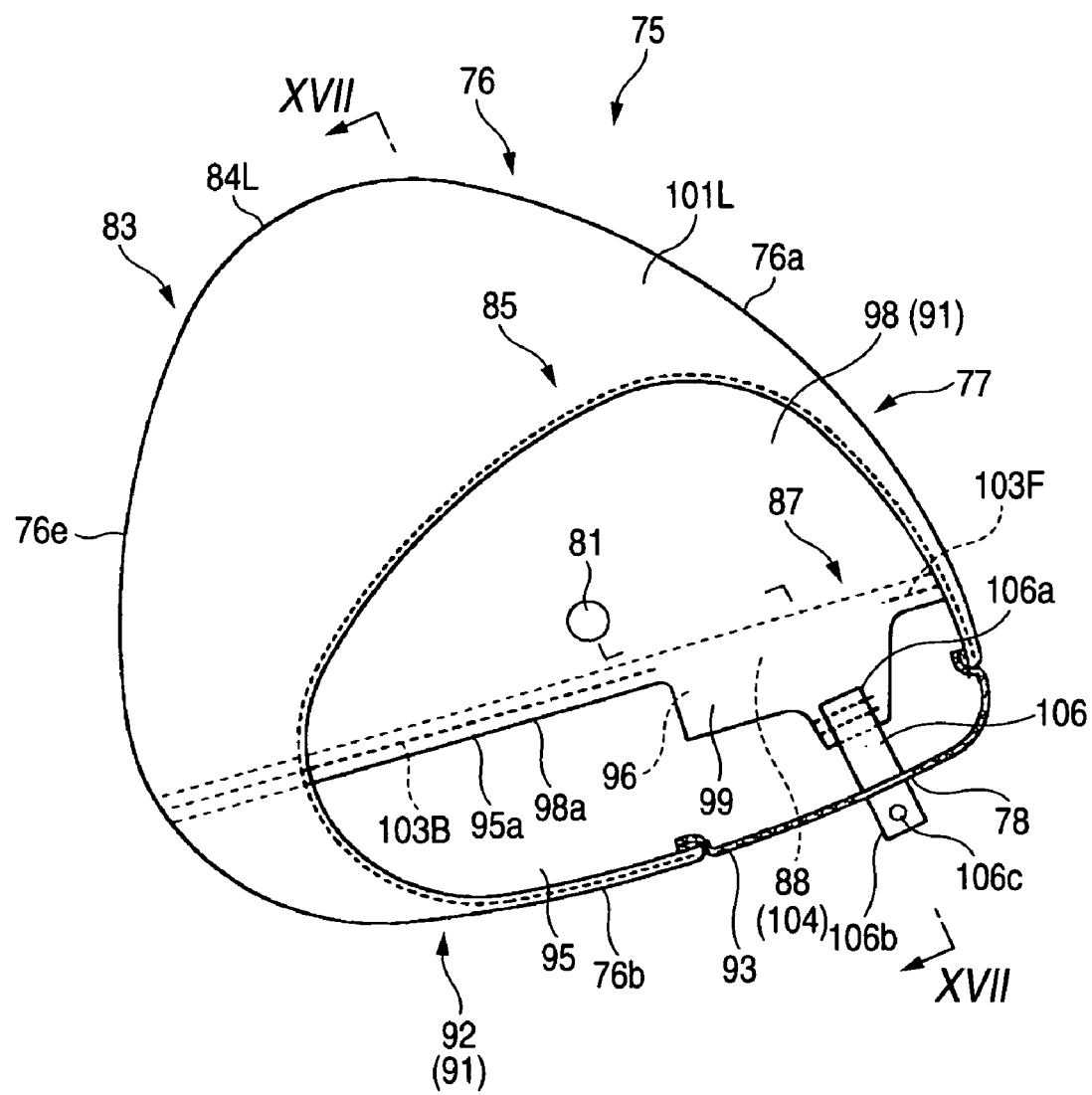
FIG. 16 is a schematic sectional view of the air bag shown in FIG. 15 taken along the longitudinal direction of the vehicle.
Figure 17:
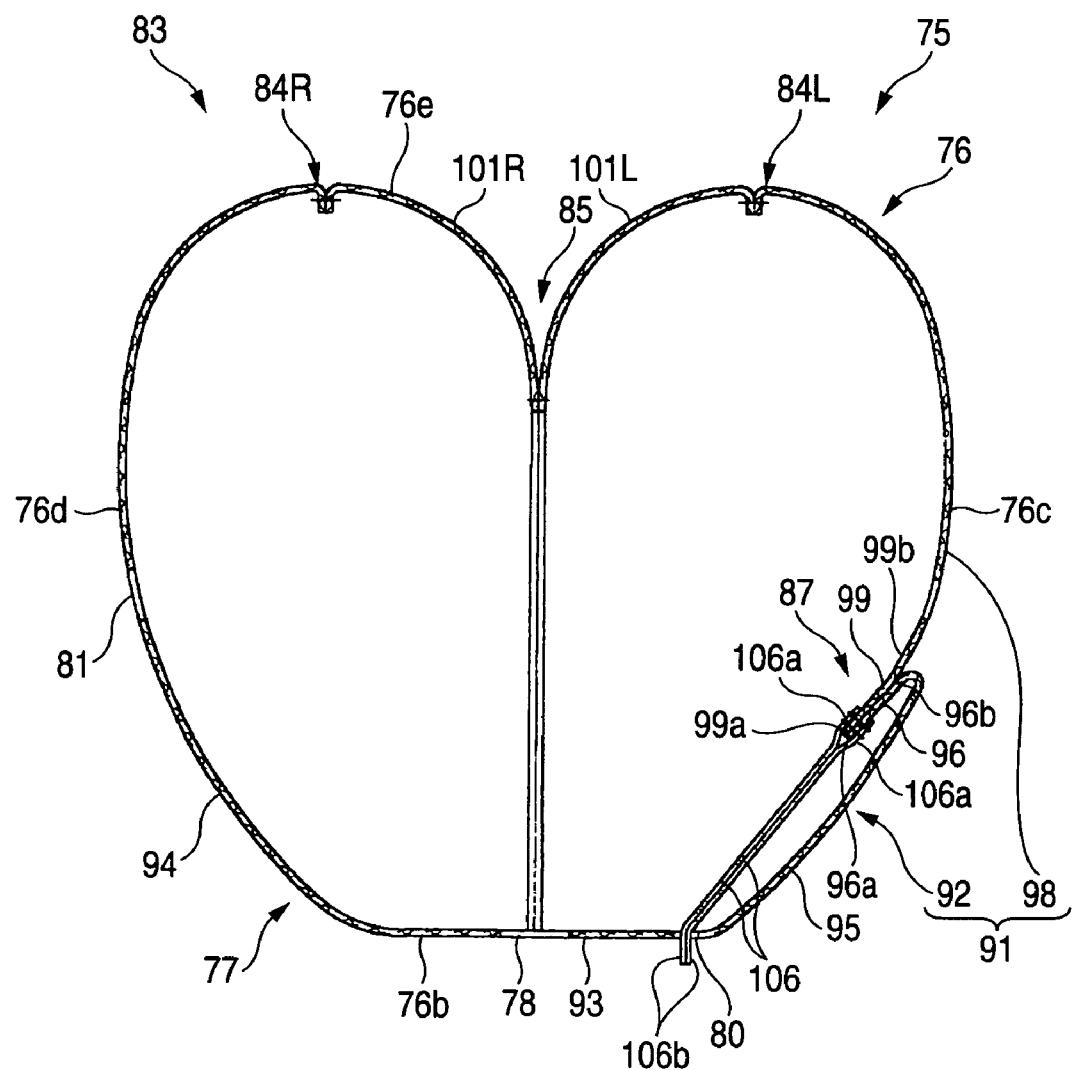
FIG. 17 is a schematic sectional view taken substantially along a vertical direction of the air bag shown in FIG. 15, which is a view taken along the line XV-XV in FIG. 16.

As is shown in FIGS. 15 to 17, the air bag 77 used in the air bag system M2 is made up of a bag-shaped bag main body 76 which is made to inflate by allowing an inflation gag to flow thereinto, a discharge portion 87 which is provided on the bag main body 76 and a connecting member 206 which is disposed within the bag main body 76 while being connected to the discharge portion 87 on a bottom portion side thereof.

The bag main body 76 is made to be formed into a substantially quadrangular cone shape with an apex formed at a front end thereof when it has completed its inflation so as to fill a space between the instrument panel 73 and a front windshield FW when it has inflated completely and includes an upper wall portion 76a and a lower wall portion 76b which are provided substantially along a transverse direction on upper and lower sides of the bag main body 76, respectively, a left-side wall portion 76c and right-side wall portion 76d which are provided substantially along a longitudinal direction on left- and right-hand sides of the bag main body 76, and a rear wall portion 76e which is provided substantially along the transverse direction so as to connect the upper wall portion 76a and the lower wall portion 76b on an occupant side of the bag main body 76. In addition, the bag main body 76 of the embodiment is configured to include an occupant protecting portion 83 which is provided to be positioned on the rear side which is the occupant side when the bag main body 76 completes its inflation and a substantially tubular body side portion 77 which is provided to be positioned in front of the occupant protecting portion 83 and between the instrument panel 73 and the front windshield FW when the bag main body 76 completes its inflation with a front end side thereof closed, and an inlet opening 78 is provided in such a manner as to be formed into a circular shape so as to allow inflation gas to flow therethrough into the bag main body 76 in a location on the bag main body 76 which is positioned on a front end side of the lower wall portion 76b and in the vicinity of a transverse center of the body side portion 77 when the bag main body completes its inflation and to be attached to the case along a circumferential edge thereof. A plurality of mounting holes 79 are formed round the circumferential edge of the inlet opening 78 so that bolts 6a of the retainer 6D are made to pass therethrough to attach the circumferential edge of the inlet opening 78 together with the inflator 8D to a bottom wall portion 12D of the case 10. In addition, vent holes 81 are formed in the left wall portion 76c and the right wall portion 76d of the bag main body 76 so that excess inflation gas is vented therethrough.

As is shown in FIGS. 15 to 17, in the case of this embodiment, the occupant protecting portion 83 is configured to include two shoulder restraining portions 84L, 84R which protrude to the rear, the two shoulder restraining portions 84L, 84R being provided side by side in the transverse direction while extending in a vertical direction, and a recessed portion 85 is provided between the shoulder restraining portions 84L, 84R in such a manner as to be relatively set back to the front. The recessed portion 85 is formed to extend substantially along the vertical direction between the shoulder restraining portions 84L, 84R when the air bag 75 completes its inflation. A state in which the left and right shoulder restraining portions 84L, 84R are raised and a state in which the recessed portion 85 is recessed are provided to continuously extend over the bag main body 76 from the rear wall portion 76e to a location which is positioned in the vicinity of the inlet opening 78 in the body side portion 77 in such a manner as to extend to a front side area defined by the upper wall portion 76a and the lower wall portion 76b. Specifically, the raised state of the shoulder restraining portions 84L, 84R and the recessed state of the recessed portion 85 are converged to be formed into a flat plane in a location of a lower portion 93 of an external base sheet 91, which will be described later.

The discharge portion 87 is provided in the area of the body side portion 77, and specifically, the discharge portion 87 is provided in a position which lies in the vicinity of a front end of the left wall portion 76c of the bag main body 76 when it completes its inflation and in a position slightly further downwards than a vertical center thereof. Specifically, the discharge portion 87 is positioned above the inlet opening 78 in the bag main body 76 when it completes its inflation and is made up of an external extended portion 96 and an internal extended portion 99 which are formed on a first base sheet 92 and a second base sheet 98, respectively.

Figure 18:
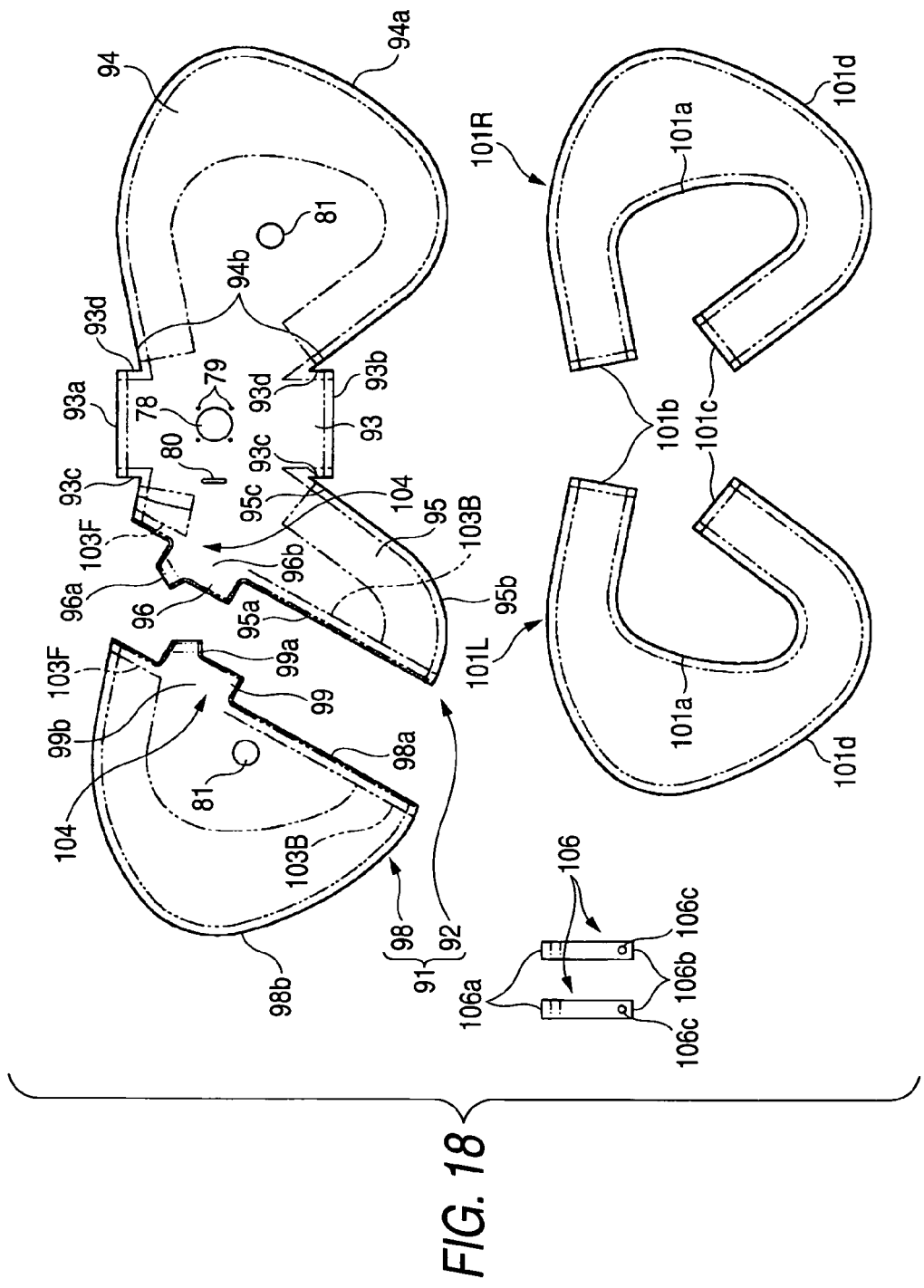
FIG. 18 is a plan view showing members which make up the air bag used in the air bag system of the second embodiment.

The bag main body 76 and the discharge portion 87 are formed, as with the air bag 33 that has been described before, of a flexible woven fabric made of polyamide fibers or polyester fibers, and as is shown in FIG. 18, the bag main body 76 and the discharge portion 87 are made by sewing a circumferential edge of the external base sheet 91 which make up front side portions of the left wall portion 76c, the right wall portion 76d and the lower wall portion 76b and circumferential edges of two internal base sheets 101L, 101R which make up rear side portions of the upper wall portion 76a, the rear wall portion 76e and the lower wall portion 76 to each other.

The external base sheet 91 which makes up a main body base sheet is made of two base sheets, the first base sheet 92 which makes up an area from an upper portion side of the left wall portion 76c to a front portion side of the lower wall portion 76b and the right wall portion 76d and the second base sheet 98 which makes up an area on a lower portion side of the left wall portion 76c in such a manner as to divide the area of the left wall portion 76c of the bag main body 76 into two when it completes its inflation, and the main body base sheet is formed into a shape which is symmetrical laterally as of the shape of a butterfly with its wings deployed in such a state that the first base sheet 92 and the second base sheet 98 are joined together.

Figure 20:
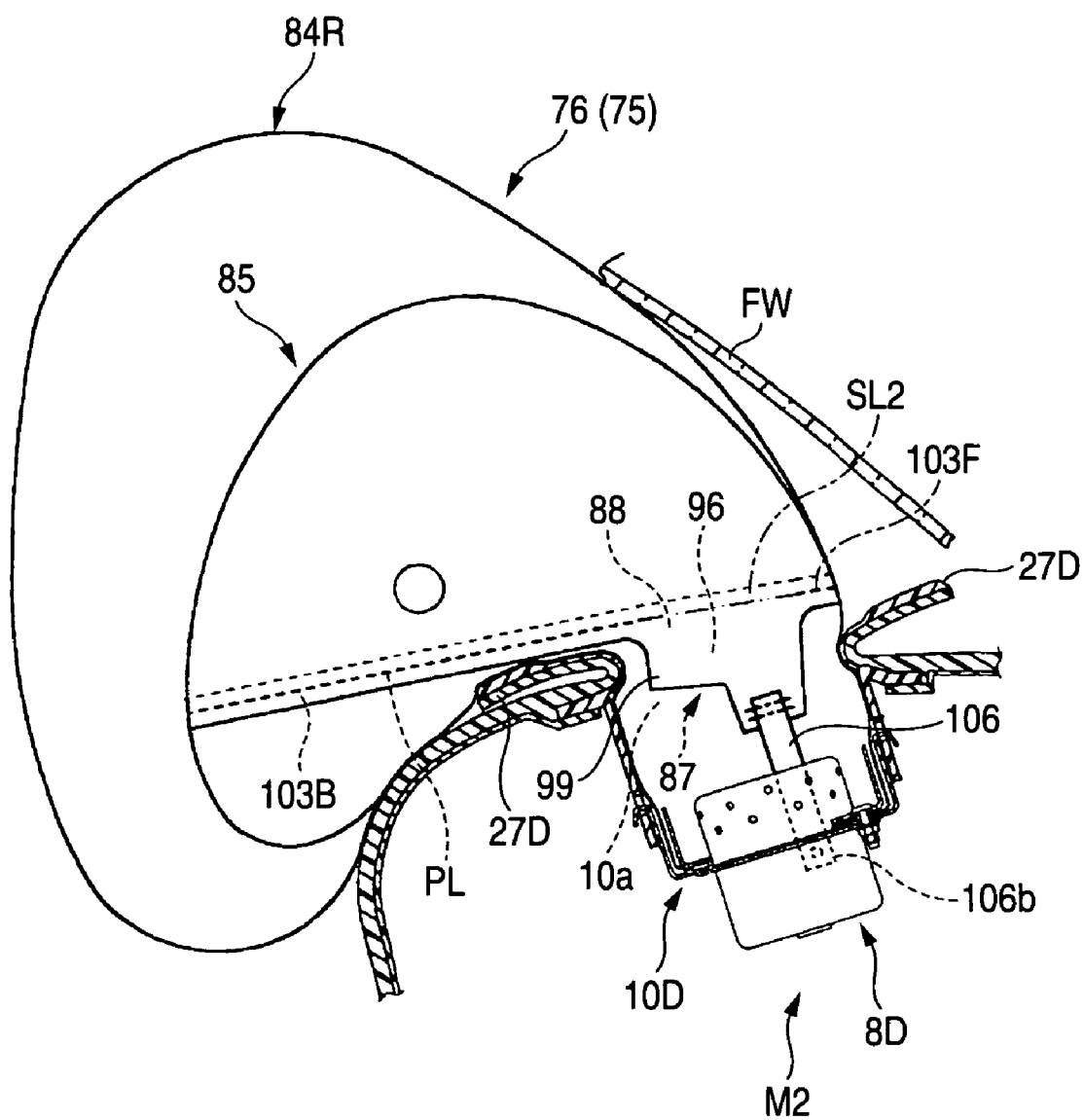
FIG. 20 is a drawing showing a state in which the air bag has completed its inflation in the air bag system of the second embodiment with the discharge portion closed, which is a schematic vertical sectional view taken along the longitudinal direction of the vehicle.

The first base sheet 92 is configured to include a substantially rectangular lower portion 93 which makes up a circumferential edge portion of the inlet opening 78 in the body side portion 77, a right portion 94 which is formed into a substantially triangular plate shape and which is provided in such a manner as to extend rightwards from the lower portion 93, and a left portion 95 which is provided in such a manner as to extend leftwards from the lower portion 93. In the case of the embodiment, the left portion 95 is formed into an external shape which would result when cutting part of the right portion 94 and is formed into a shape which matches the external shape of the right portion 94 in such a state that the second base sheet 98 is joined thereto by sewing a corresponding upper edge 98a of the second base sheet 98 to a lower edge 95a of the first base sheet 92. In addition, in the bag main body 76 of the embodiment, a boundary line PL (sewn portions 103F, 103B, which will be described later, where the lower edge 95a of the left portion and the upper edge 98a of the second base sheet 98 are sewn together) PL between the first base sheet 92 and the second base sheet 98 is provided to extend substantially along the longitudinal direction so as to follow substantially an open plane of the case 10D when the bag main body 76 completes its inflation (refer to FIGS. 20, 22). The inlet opening 78, the mounting holes 79, a passage hole 80 and the vent holes 81 are formed in the predetermined positions on the first base sheet 92, and an external extended portion (an extended portion) 96 which makes up an external portion (a outer circumferential side portion) of the discharge portion 87 is provided on the lower edge 95a side of the left portion 95. The external extended portion 96 is configured such that a portion of the bag main body 76 which is positioned above the inlet opening 78 when the bag main body 76 completes its inflation is provided in such a manner as to extend partially, and is formed into a substantially rectangular shape which protrudes in such a manner as to intersect the lower edge 95a substantially at right angles. The external extended portion 96 is folded back in the vicinity of a boundary line with the left portion 95 when producing the air bag 75 so as to be disposed within the bag main body 76 with a tip end 96a side thereof oriented towards the inlet opening 78. In addition, an internal extended portion (an extended portion) 99 which makes up the discharge portion 87 is formed to be disposed also on the upper edge 98a side of the second base sheet 98 in such a manner as to be superposed on an inner circumferential side of the external extended portion 96 formed on the left portion 95. The internal extended portion 99 is formed into an external shape which matches that of the external extended portion 96.

The two internal base sheets 101L, 101R which make up a main body base sheet are each formed into a belt shape which is curved into a substantially C-shape and is configured to divide into two in the transverse direction an area extending from the upper wall portion 76a to a portion on a rear portion side of the lower wall portion 76b when the bag main body 76 completes its inflation, so as to make up the upper wall portion 76a and the rear wall portion 76e of the bag main body 76, and the portion on the rear portion side of the lower wall portion 76b.

In addition, in the air bag 75 of the embodiment, the discharge portion 87 is made up of the external extended portion 96 which is formed on the left portion 95 of the first base sheet 92 and the internal extended portion 99 of the second base sheet 98 which is superposed on the inner circumferential side of the external extended portion 96, and the external extended portion 96 and the internal extended portion 99 are left in a non-joined state in which circumferential edges of the external extended portion 96 and the internal extended portion 99 are not sewn together along the full circumference thereof. In addition, the external extended portion 96 and the internal extended portion 99 are not sewn to each other also in the bottom portions 96b, 99b, and a non-sewn portion 104 (a non-joined portion) (a non-sewn portion 104 between the sewn portions 103F, 103B which are formed by sewing (joining) together the lower edge 95a of the left portion 95 and the upper edge 98a of the second base sheet 98) on the bottom portions 96b, 99b sides is made to make up the discharge port 88 through which the inflation gas is discharged when it opens. In addition, the external extended portion 96 and the internal extended portion 99 are configured such that the connecting members 106 are connected to the tip ends 96a, 99a thereof, respectively.

The connecting member 106 is provided separately from the bag main body 76 and is made of a flexible belt-shaped fabric material. In the case of the embodiment, the connecting member 106 is provided two, and bottom portion 106a sides thereof are securely sewn to the external extended portion 96 and the internal extended portion 99, respectively, and a passage hole 106c through which a locking pin 21 of the locking member 20D can be passed is provided on the tip end 106*b* side of each connecting member 106. In addition, in the case of the embodiment, each connecting member 106 is set to such a length dimension that the air bag 75 is allowed to complete its inflation without any problem even when the air bag 75 inflates in such a manner that the discharge portion 87 is withdrawn into the bag main body 76 with the connection of the connecting member 106 with the locking pin 21D maintained by the locking pin 21D being passed through the passage hole 106*c*. In addition, in the case of the embodiment, each connecting member 106 is configured to be disposed in such a manner as to intersect the open plane of the case 10D substantially at right angles so as to follow substantially the protruding direction of the air bag 75 when the air bag 75 inflates with the connection of the connecting member 106 with the locking pin 21D maintained by the locking pin 21D being passed through the passage hole 106*c* (refer to FIG. 20). In addition, in the case of the embodiment, the bottom portion 106*a* sides of the connecting members 106 are sewn to the external extended portion 96 and the internal extended portion 99 in such a manner that the connecting members 106 intersect edge portions of the tip ends 96*a*, 99*a* of the external extended portion 96 and the internal extended portion 99 obliquely in the longitudinal direction.

Next, the production of the air bag 75 of the second embodiment will be described. The connecting members 106 are sewn to the external extended portion 96 of the first base sheet 92 and the internal extended portion 99 of the second base sheet 99 in advance. Then, firstly, the left portion 95 of the first base sheet 92 and the second base sheet 98 are superposed on each other in such a manner that external surfaces thereof face each other with the edge portions of the external extended portion 96 and the internal extended portion 99 made to match each other and the lower edge 95*a* and the upper edge 98*a* made to match each other, and the lower edge 95*a* and the upper edge 98*a* are sewn in a straight line with a sewing yarn in such a manner as to form sewn portions 103F, 103B, so that the first base sheet 92 and the second base sheet 98 are connected to each other. In addition, the internal base sheets 101L, 111R are superposed on each other in such a manner that external surfaces face each other, so that internal edge portions 101*a*, 101*a* are sewn together securely. Following this, the internal base sheets 101L, 101R are opened in such a manner that front edge portions 101*b*, 101*b* are disposed substantially in a straight line while a sewing margin of the internal edge portions is kept disposed inside, and the front edge portions 101*b* of the internal base sheets 101L, 101R which are disposed in a straight line are sewn securely to a front edge portion 93*a* of the lower portion 93 of the first base sheet 92 of the external base sheet 91. Similarly, rear edge portions 101*c* of the internal base sheets 101L, 101R which are disposed in a straight line are sewn securely to a rear edge portion 93*b* of the lower portion 93. Then, front and rear left edge portions 93*c* of the lower portion 93 are sewn securely to a bottom portion side edge portion 95*c* of a circumferential edge portion 95*b* of the left portion 95 of the first base sheet 92, and front and rear right edge portions 93*d* are sewn securely to a bottom portion side edge portion 94*b* of a circumferential edge portion 94*a* of the right portion 94. Thereafter, the circumferential portion 95*b* of the left portion 95 and the circumferential edge portion 98*b* of the second fabric 98 are sewn securely to an external edge portion 101*d* of the internal base sheet 101L, and the circumferential edge portion 94*a* of the right portion 94 is sewn securely to an external edge portion 101*d* of the internal base sheet 10R. Then, the bag main body 76 is turned inside out by making use of the inlet opening 78 in such a manner that the sewing margins of the edge portions do not appear from the external surface of the air bag 75, whereby the air bag 75 can be produced.

In addition, in the air bag system M2 of the second embodiment, the retainer 6D is inserted from the inlet opening 78 into the interior of the air bag 75 which has been produced according to the procedure described above, and the air bag 75 is folded so as to be accommodated in the case 10D in such a manner that the bolts 6*a* are made to protrude from the mounting holes 79. As this occurs, the discharge portion 87 is withdrawn into the bag main body 76 in such a state that the external extended portion 96 and the internal extended portion 99 are superposed on each other, and the portion at the tip end 106*b* of each connecting member 106 is made to protrude from the passage hole 80 to the outside of the bag main body 76. These discharge portion 87 and the connecting members 106 are folded up together with bag main body 76, and even after the air bag 75 has been folded up completely, the portions at the tip ends 106*b* of the connecting members 106 are kept protruding from the passage holes 80 to the outside of the bag main body 76. Following this, the respective bolts 6*a* are made to protrude from the passage holes 12*b* in the bottom wall portion 12D, the tip ends 106*b* of the connecting members 106 are made to protrude from the through holes 12*c*, and the air bag 75 so folded is then accommodated with the case 10D to which the locking member 20D has been attached in advance. Then, the locking pin 21D of the locking member 20D is passed through the passage hole 106*c*, and the tip end 106*b* of each connecting member 106 is locked on the locking member 20D in such a manner that a tip end of the locking pin 20D is held on the holding piece 12D. Thereafter, as with the air bag system M1, the inflator 8D is mounted in the case 10D, and thereafter, the case 10D is coupled to the air bag cover 24D in the instrument panel 73 mounted on the vehicle, the case 10D being then fixed to the body of the vehicle by making use of a mounting bracket, not shown, whereby the front seat passenger air bag system M2 of the second embodiment can be installed on the vehicle.

Also in the air bag system M2 of the second embodiment, when producing the air bag 75, in the event that in the two adjacent first base sheet 92 and second base sheet 98 which make up the main body base sheet, the lower edge 95*a* of the left portion 95 and the upper edge 98*a* of the second base sheet 98 are sewn together securely at the location of the sewn portions 103F, 103B excluding the locations of the external extended portion 96 and the internal extended portion 99, the discharge portion 87 and the discharge port 88 can be formed at the same time as the bag main body 76 is formed. Namely, also in the air bag system M2 of the second embodiment, in the event that the first base sheet 92 and the second base sheet are sewn together securely in the locations of the sewn portions 103F, 103B so as to form the external base sheet 91 and that the circumferential edges of the external base sheet 91 and the internal base sheets 101L, 101R are sewn securely to each other, the discharge portion 7 and the discharge port 88 can be formed. In addition, also in the air bag system M2 of the second embodiment, since the discharge port 88 is made up of the portions of the first base sheet 92 and the second base sheet 98 which lie between the sewn portions 103F, 103B, in other words, the non-sewn portions 104 (the gaps) between the sewn portions 103F, 103B where no sewing operation is performed, an opening that is to make up a discharge port does not have to be formed by separately cutting a hole in the base sheets making up the air bag 75. Due to this, also in the air bag system M2 of the second embodiment, increases in the number of man-hours for production of air bags and production costs can be suppressed.

Also in the air bag system M2 of the second embodiment, in the event that the external base sheet 91 which makes up the air bag 75 is simply divided into two, the first base sheet 92 and the second base sheet 98 and the first base sheet 91 and the second base sheet 98 are sewn in a straight line in the locations of the sewn portions 103F, 103B, the discharge portion 87 and the discharge port 88 can be formed, the discharge portion 87 and the discharge port 88 being thus produced with ease.

Figure 21:
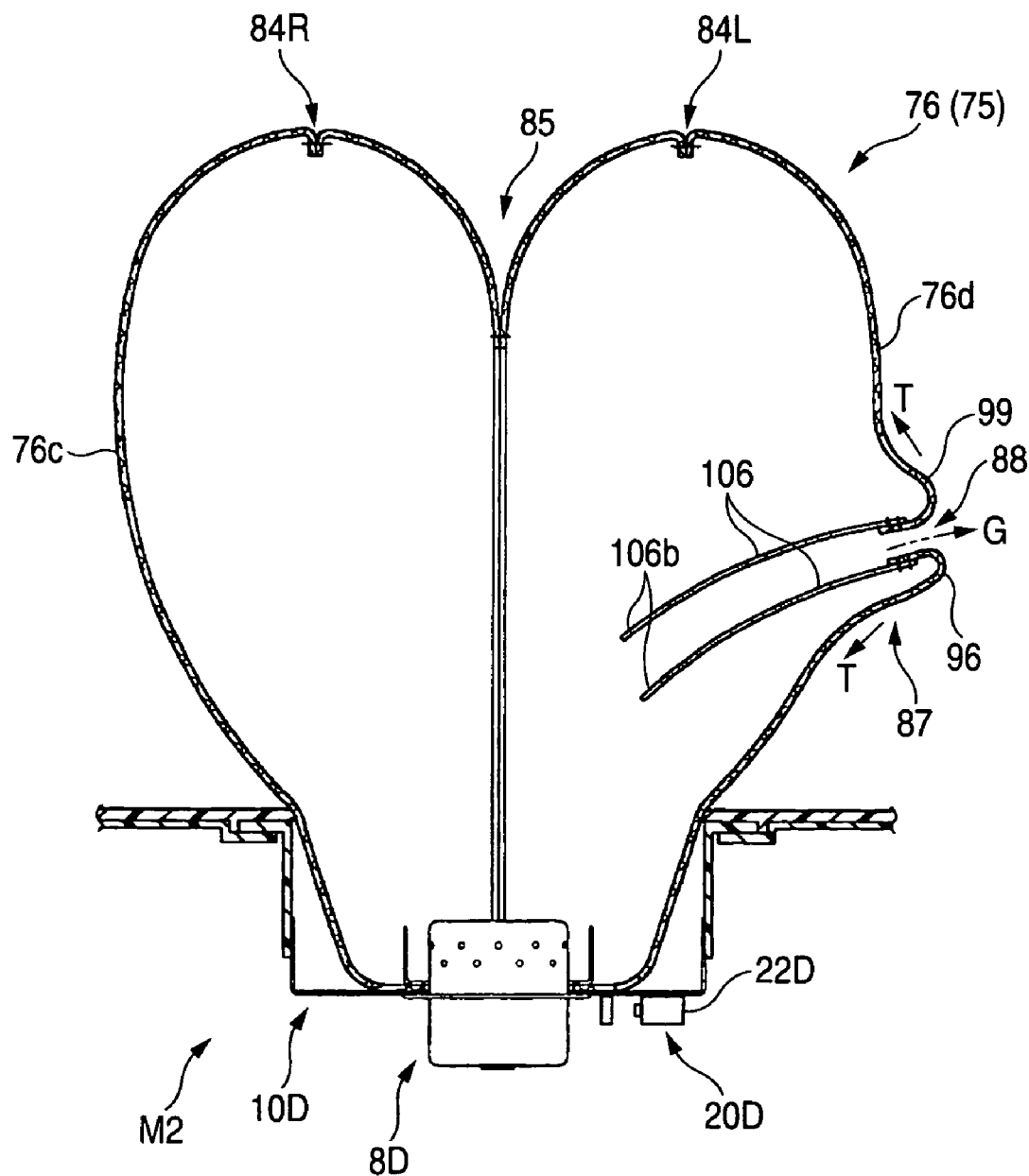
FIG. 21 is a drawing showing a state in which the air bag has completed its inflation in the air bag system of the second embodiment with the discharge portion opened, which is a schematic horizontal sectional view taken along the longitudinal direction of the vehicle.
Figure 22:
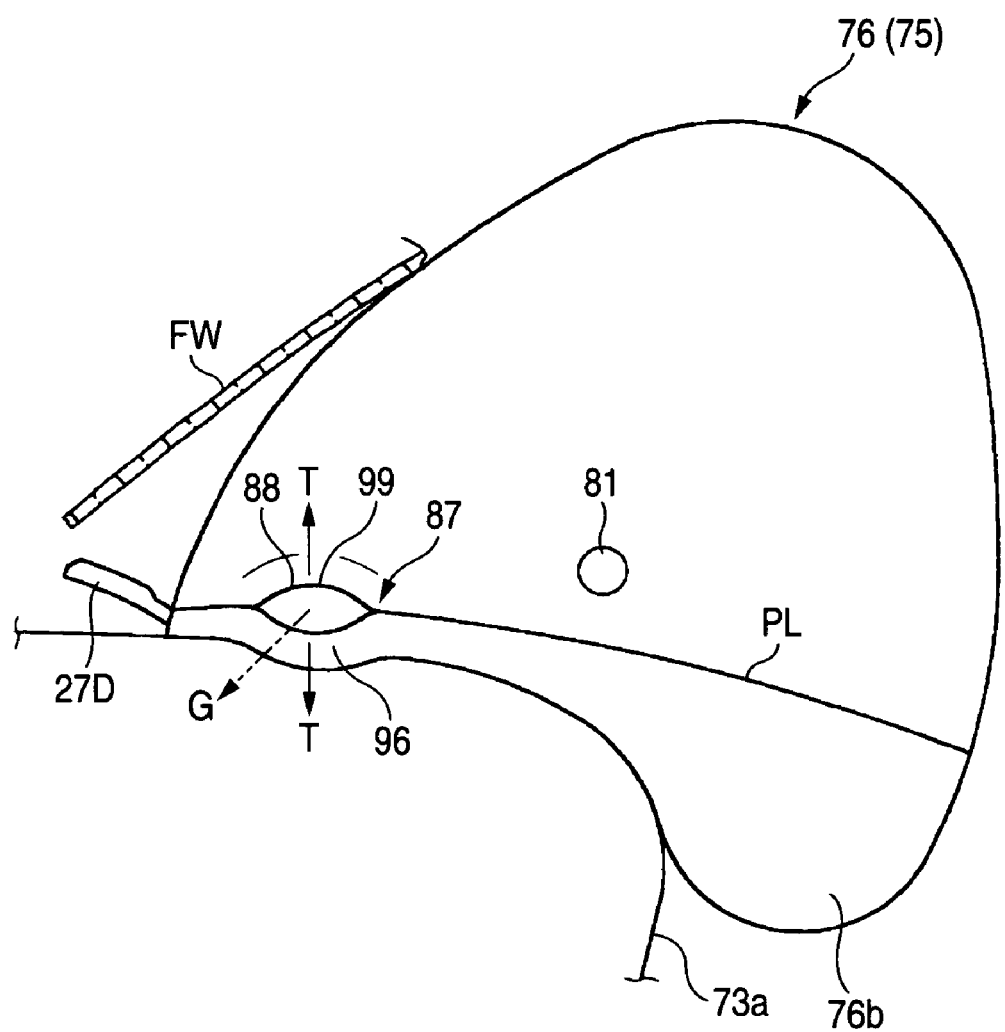
FIG. 22 is a drawing showing a state in which the air bag has completed its inflation in the air bag system of the second embodiment with the discharge portion opened, which is a schematic vertical sectional view taken along the longitudinal direction of the vehicle.

In addition, also in the air bag system M2 of the second embodiment, the opening and closing of the discharge port 88 provided in the discharge portion 87 is controlled by maintaining or canceling the connection of the connecting member 106, in which the discharge portion 87 to which the bottom portion 106a side thereof is connected is configured to be withdrawn into the bag main body 76 and the tip end 106b side thereof is connected to the locking member 20, with the locking member 20. In addition, also in the air bag system M2 of the second embodiment, when the control unit 67D detects that, for example, an occupant of a small build is seated in the seat, after the inflation gas is discharged from the inflator 8D and the air bag 75 is about to complete its inflation, the control unit 67D outputs an operation signal to the actuator 22D to operate to withdraw the locking pin 21D of the locking member 20D, so that the air bag 75 is made to complete its inflation with the lock state resulting between the tip end 106b side of the connecting member 106 and the locking pin 21D canceled. As this occurs, the discharge portion 87 which is made to communicate with the bag main body 75 is made to protrude from the withdrawn state to the outside of the bag main body 76, whereby as is shown in FIGS. 21, 22, in the location of the discharge port forming non-sewn portion 104 which is made up the location between the sewn portions 103F, 103B, the external extended portion 96 and the internal extended portion 99 are made to be separated from each other, so as to form the discharge port 88, this allowing the inflation gas to be discharged from this discharge port 88. Namely, with the connection of the connecting member 106 with the locking member 20D canceled, a mode is produced where the external extended portion 96 and the internal extended portion 99 are made to be spaced apart from each other in the location of the non-sewn portion 104, so as to cause the discharge port 88 to open in such a way that it opens naturally, whereby the discharge port 88 can be made to be opened in a stable fashion, so that an excess portion of the inflation gas is discharged from the discharge port 88, thereby making it possible to suppress the internal pressure. As a result, also in the air bag system M2 of the second embodiment, the occupant with a small build can securely be protected by the air bag 75 which has completed its inflation without pressing him or her more than required.

Figure 19:
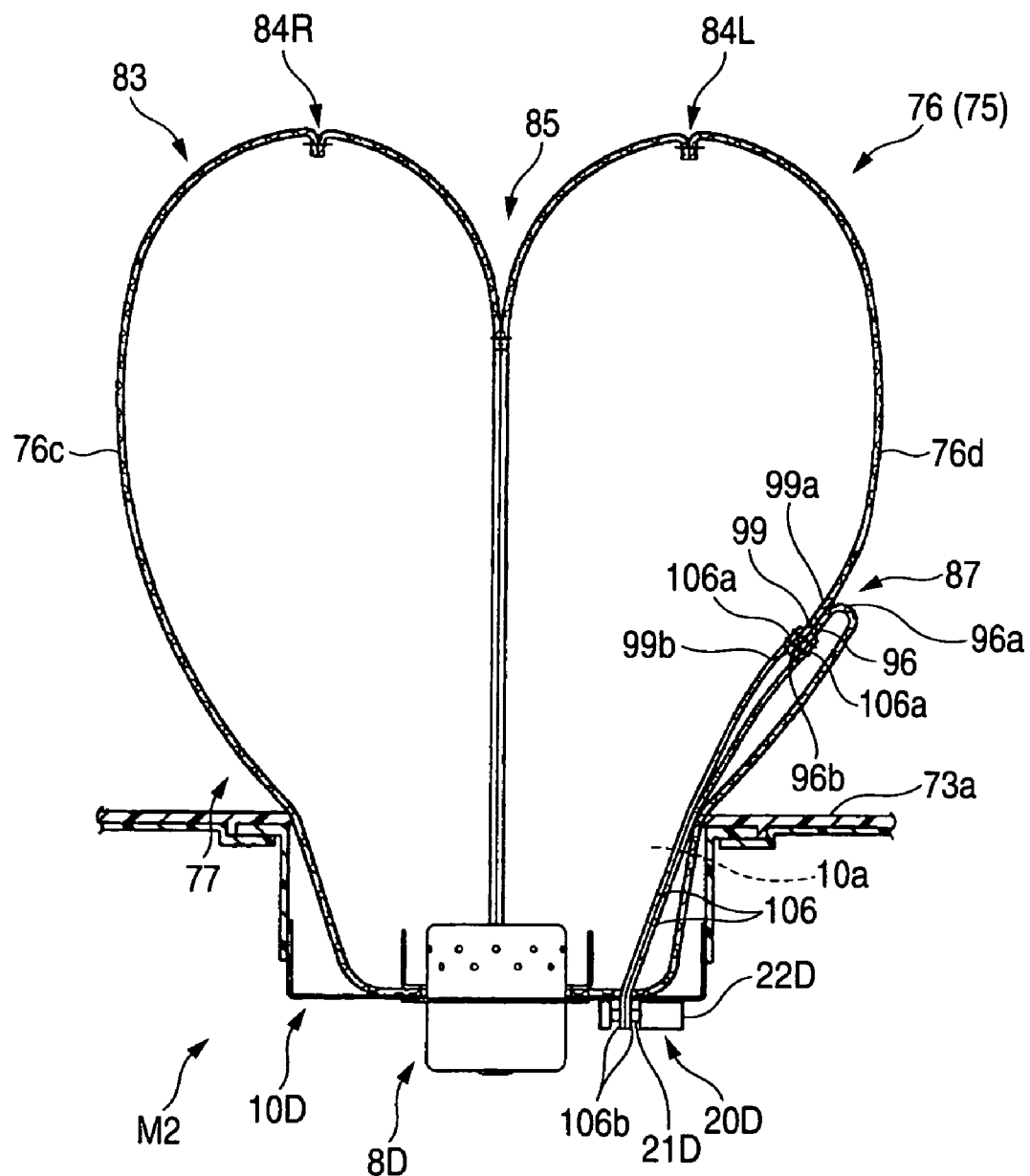
FIG. 19 is a drawing showing a state in which the air bag has completed its inflation in the air bag system of the second embodiment with a discharge portion closed, which is a schematic horizontal sectional view taken along the longitudinal direction of the vehicle.

On the contrary, when the control unit 67D detects that an occupant of a large build is seated in the seat or that the occupant is seated in a position which is apart further from the instrument panel 73 than his or her normal seating position, no operation signal is outputted from the control unit 67D to the actuator 22D, whereby the air bag 75 is made to complete its inflation with the lock of the connecting member 106 with the locking pin 21D maintained by the locking pin 21D being passed through the passage hole 106c on the tip end 106b side of the connecting member 106. As this occurs, the bag main body 76 is made to inflate with the discharge portion 87 withdrawn in the bag main body 76 by the connecting member 106 (refer to FIGS. 19 and 20). As this occurs, in the discharge portion 87 which is kept withdrawn by the connecting member 106 which is connected to the locking member 20D, the external extended portion 96 and the internal extended portion 99 are brought into pressure contact with each other by virtue of the internal pressure produced by the inflation gas which is allowed to flow into the bag main body 76, so as to form the linear seal portion SL2 which connects in a straight line the adjacent end portions of the sewn portions 103F, 103B (refer to FIG. 20). Namely, since the external extended portion 96 and the internal extended portion 99 are brought into pressure contact with each other to thereby form the linear seal portion SL2 which seals the non-sewn portion 104 (the discharge port 88), the discharge port 88 can be closed accurately, whereby the discharge of inflation gas from the discharge port 88 can be suppressed as much as possible, thereby making it possible to maintain a high internal pressure. As a result, also in the air bag system M2 of the second embodiment, the opening and closing of the discharge port 88 can accurately be controlled by maintaining or canceling the connection of the connecting member 106 with the locking member 20D while securing the sealing properties of the discharge port 88, thereby making it possible to control the internal pressure of the air bag 75 when it has completed its inflation.

Consequently, also in the air bag system M2 of the second embodiment, the opening and closing of the discharge port 88 can accurately be controlled with the simple configuration, thereby making it possible to control the internal pressure of the air bag 75.

In addition, in the air bag system M2 of the second embodiment, the discharge portion 87 is formed in the location of the left wall portion 76c of the bag main body 76 which inflates into the substantially quadrangular cone shape when it completes its inflation. Namely, in the air bag system M2 of the second embodiment, the location in the vicinity of the front end of the left wall portion 76c where the discharge portion 87 is provided is disposed in the curved surface area which protrudes towards the outer circumferential side of the bag main body 76 in the vertical section which intersects a straight line which follows substantially the longitudinal direction which substantially follows the open plane of the case 10D while connecting the sewn portions 103F, 103B in a straight line substantially at right angles when the air bag 75 has completed its inflation with the discharge portion 87 kept closed (refer to FIG. 19. In other words, in the air bag 75, in the air bag system M2 of the second embodiment, in a section which intersects the non-sewn portion 104 which makes up the discharge port 88, that is, the linear seal portion SL2 which connects the sewn portions 103F, 103B in a straight line substantially at right angles, the left wall portion 76c which is disposed on the periphery of the linear seal portion SL2 is formed into a curved surface shape which protrudes to the outer circumferential side. Because of this, also in the air bag system M2 of the second embodiment, when the air bag 75 inflates in such a state that the withdrawal of the discharge portion 87 is canceled so that the discharge port 88 is opened, since tension T (refer to FIGS. 21, 22) acting on the first base sheet 92 and the second base sheet 98 which make up the bag main body 76 while the internal pressure is in action acts along a direction in which the discharge port 88 is made to open, the discharge port 88 can maintain stably the open shape which results when the external extended portion 96 and the internal extended portion 99 are made to be spaced apart from each other to form an opening so that the discharge port 88 is made to open naturally, thereby making it possible to discharge the inflation gas from the discharge port 88 in a stable fashion.

Furthermore, in the air bag system M2 of the second embodiment, the connecting member 106 is provided two, so that the connecting members 106 so provided are made to be joined to the edge portions 96a, 99a of the respective external extended portion 96 and internal extended portion 99. Due to this, as is shown in FIGS. 21, 22, the whole of the discharge port 88 which is made up of the non-sewn portion 104 lying between the sewn portions 103F, 103B is made to be opened, the open area of the discharge port 88 when it opens can be secured to a large extent.

In addition, in the second embodiment, while the discharge portion 87 is formed only on the left wall portion 76c of the air bag 75, the discharge portion may of course be provided both on the left and right sides of the air bag 75, and furthermore, a configuration may be adopted in which the discharge portion is provided on the upper wall portion. In the event that the discharge portion is provided on the upper wall portion of the front seat passenger air bag, since the front windshield exists in the vicinity of the discharge portion when the airbag completes its inflation, in this case, in the event that the discharge portion configured similarly to the discharge portion 41 of the air bag 33 of the first embodiment, the open surface of the discharge opening from which the inflation gas is actually discharged is made difficult to be closed by the windshield, whereby the open area when the discharge port opens can be secured with ease in a stable fashion. Because of this, in the event that the discharge portion is provided on the upper wall portion of the front seat passenger air bag, as with the air bag of the first embodiment, it is preferable to provided a discharge portion in which a connecting member is provided one, and the tip ends of the two extended portions are both sewn to the connecting member so provided.

In addition, in the embodiments, in the air bags 33, 75, while the base sheets are sewn together using the sewing yarn, so as to form the sewn portions 54L, 54R, 103F, 103B, the joining means of the base sheets is, of course, not limited thereto, and hence, the circumferential edges of the base sheets may be joined together using an adhesive or the like, so as to form joined portions.

Furthermore, in the embodiments, since the connecting members 64, 106 are disposed in such a manner that their longitudinal directions are made to follow substantially the protruding directions of the air bags 33, 77 when the air bags 33, 75 complete their inflation, when the air bags 33, 75 inflate with the connection of the connecting members 64, 106 with the locking members (the opening and closing control units) 20, 20D maintained, the withdrawn states of the discharge portions 41, 87 can be held accurately by the connecting members 64, 106, whereby the protrusion of the discharge portions 41, 87 to the outside of the bag main bodies 34, 76 can be suppressed. Of course, unless a point like this is taken into consideration, a configuration may be adopted in which the connecting members are disposed in such a manner as to intersect the protruding directions of the air bags. In addition, in the air bags 33, 75 of the embodiments, while the connecting members 64, 106 are formed of the fabric materials which are separate from the bag main bodies 34, 76, the connecting members may of course be formed integrally with the bag main bodies in such a manner that the connecting members extend from the base sheets which make up the bag main bodies.

Furthermore, while in the air bag 33 of the first embodiment, the body side base sheet 48 is divided into the opening side base sheet 49 and the outer edge side base sheet 52, and in the air bag 75 of the second embodiment, the external base sheet 91 is divided into the first base sheet 92 and the second base sheet 98, the configurations of the air gags to which the invention can be applied are not limited thereto, and hence, for example, in the case of a steering wheel air bag, a configuration may be adopted in which extended portions are provided partly along circumferential edges of a substantially circular body side base sheet which makes up a body side wall portion and a substantially circular occupant side base sheet which makes up an occupant side wall portion, respectively, the circumferential edges of the respective body side and occupant side base sheets are joined to each other excluding the locations where the extended portions are provided, so that a bag main body, a discharge portion and a discharge port are formed.

MODIFIED EXAMPLES

Figure 23:
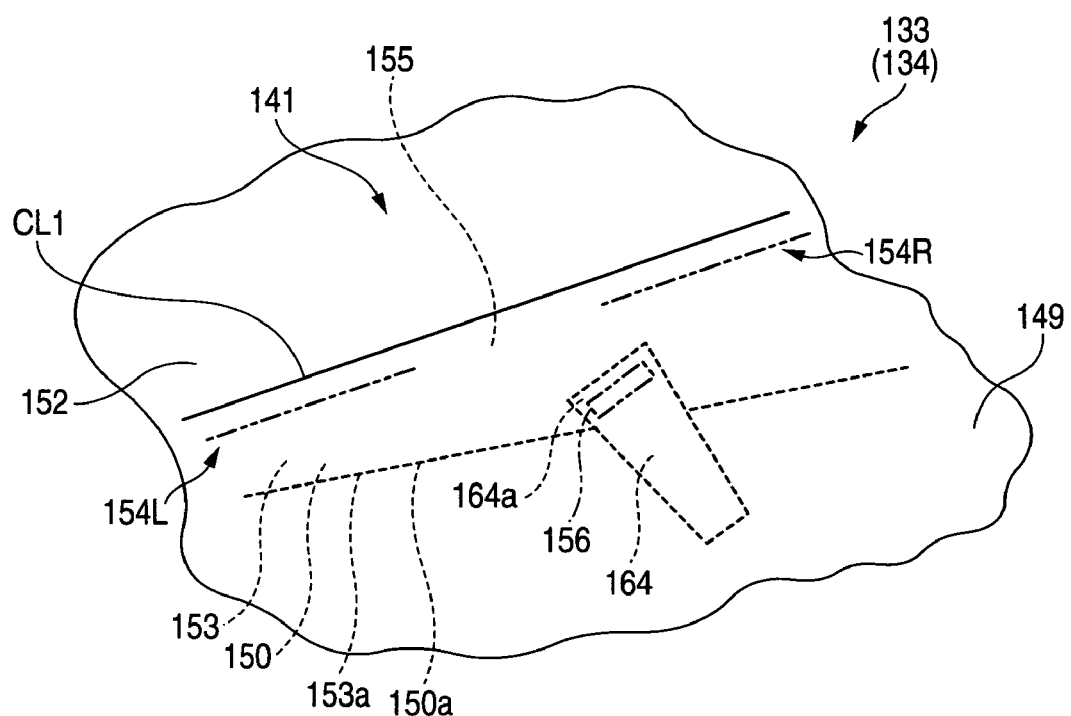
FIG. 23 is a schematic partially enlarged perspective view showing a discharge portion according to one modified example.
Figure 24:
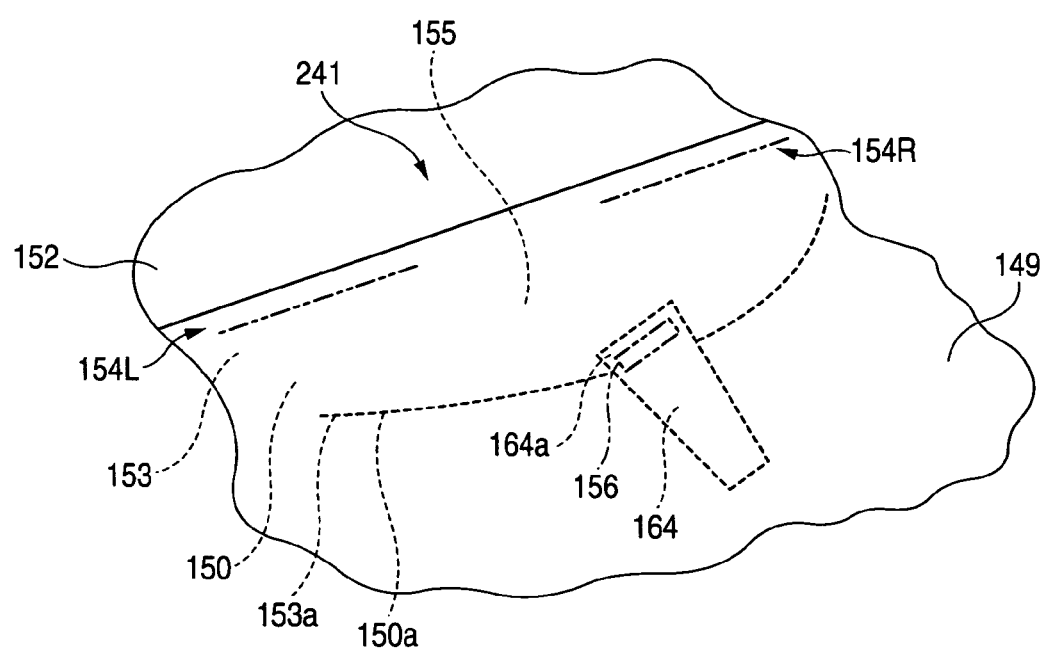
FIG. 24 is a schematic partially enlarged perspective view showing a discharge portion according to another modified example.
Figure 25:
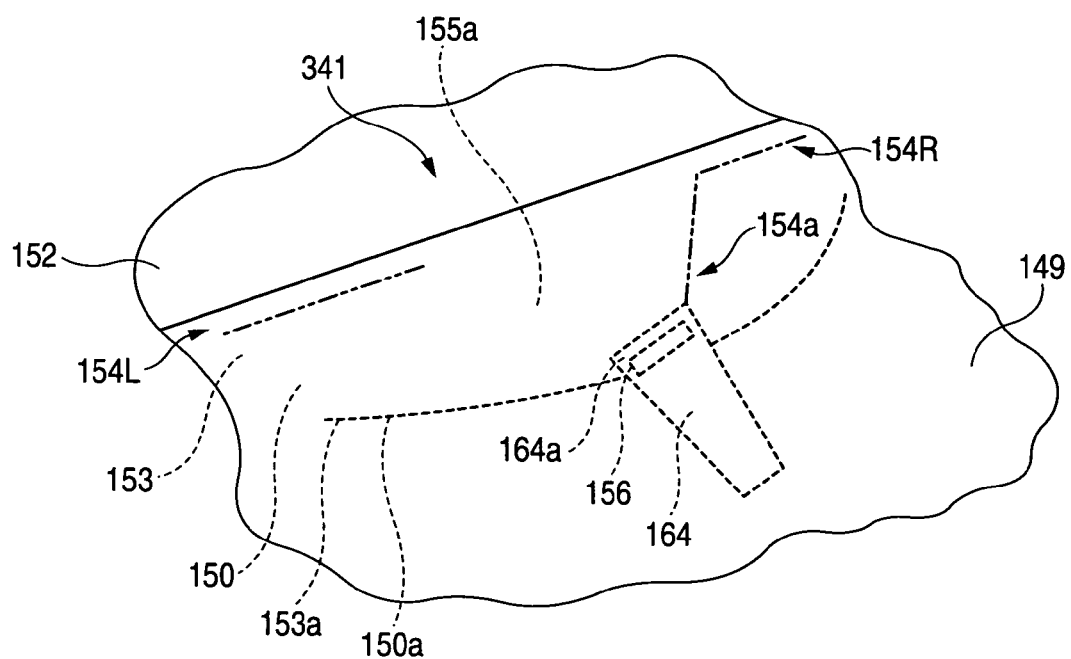
FIG. 25 is a schematic partially enlarged perspective view showing a discharge portion according to yet another modofied example.

FIGS. 23, 24 and 25 show modified examples of the invention.

In the case of one modified example shown in FIG. 23, the discharge portion 141 is provided on the body side wall portion and is made up of an external extended portion 150 and an internal extended portion 153 which are formed, respectively, on an opening side base sheet 149 and an outer edge side base sheet 152, and is provided in such a manner as to extend along substantially the whole area of the respective base sheets in the transverse direction on a front side of the inlet opening. In addition, the discharge portion 141 is configured to form a protrude portion at a location offset (shifted) from the center at a predetermined in the transverse direction (left side from the center in this modified example) which protrudes from the bag main body 134 when the air bag 133 inflates with the connection of the connecting member 164 with the locking member (the opening and closing control unit) canceled. Namely, the location of the protrude portion is not limited to the center in the traverse direction and may be changed in a suitable manner taking into account of the shape of the inflated air bag 133 and the shape of the bag holder. In addition, the discharge portion 141 is configured such that tip end edge portions 150a, 153a of the external extended portion 150 and the internal extended portion 153 are left not joined excluding the portion lying in the vicinity of the connecting member 164.

As is shown in FIG. 23, the opening side base sheet 149 includes the external extended portion (an extended portion) 150 which makes up an external portion (a body side portion) of the discharge portion 141. The external extended portion 150 is folded back to an inner circumferential side which constitutes an outer edge side base sheet 52 side along a substantially rectilinear fold line CL1 and is shaped such that a fold line CL1 side is narrowed while an edge portion 150a is formed in a tapered shape to be inclined along the transverse direction.

The outer edge side base sheet 152 is disposed so as to be superposed on an inner circumferential side of the external extended portion 150 of the opening side base sheet 149 so as to include the internal extended portion (an extended portion) 153 which make up the discharge portion 141. The external extended portion 50 and the internal extended portion 53 are both formed into the same external shape. In addition, in the case of the modified example, the opening side base sheet 149 and the outer edge side base sheet 152 are made to form a substantially circular external shape in such a state that the inside extended portion 153 is superposed on the inner circumferential side of the external extended portion 150 in such a manner that the edge portion (a rear end side when folded back) 150a of the external extended portion 150 which is folded back along the fold line CL1 is made to coincide with an edge portion 153a which extends along the transverse direction on a rear end side of the internal extended portion 153, so as to be formed into a shape which matches the shape of the occupant side base sheet, and make up the body side base sheet.

The discharge portion 141 is configured to be made by sewing together the external extended portion 150 and the internal extended portion 153 which are superposed on each other by sewn portions (joined portions) 154L, 154R which are provided along the transverse direction in such a manner as to follow substantially along the fold line CL1 in a location on the external extended portion 150 which lies in the vicinity of the fold line CL1. The sewn portions 154L, 154R are formed on both left and right end sides excluding a transverse center. In addition, a non-sewn portion 155 (a non-joined portion, or slit) between the sewn portions 154L, 154R is made up the discharge port.

In the case of the modified example, the external extended portion 150 and the internal extended portion 153 are sewn to each other by a sewn portion 156 which is formed to extend so as to be inclined to the transverse direction in a location which lies near the non-sewn portion 155 in the vicinity of the edge portions 150a, 153a. This sewn portion 156 is a portion which connects the bottom portion 164a side, which will be described later, of the connecting member 164 to the discharge portion 141, and in the case of the modified example, the connecting member 164 is sewn together with the external extended portion 150 and the internal extended portion 153 by the sewn portion 156 in such a manner that the bottom portion 164a side is held between the edge portions 150a, 153a of the external extended portion 150 and the internal extended portion 153. In addition, in the case of the modified example, as is shown in FIG. 23, the sewn portion 156 to which the connecting member 164 is securely sewn is inclined to the traverse direction as the non-sewn portion 155 is shifted left from the center in the traverse direction, and the connecting member 164 is located at the center in the traverse direction.

FIG. 24 shows another modified example, in which a discharge portion 241 is configured by further modifying the discharge portion 141 shown in FIG. 23. Namely, in the modified example shown in FIG. 24, the edge portions 150a, 153a of the external extended portion 150 and the internal extended portion 153 on the tip end side are formed into arc shapes. In other words, the edge portions 150a, 153a of the external extended portion 150 and the internal extended portion 153, which are formed by folding the opening side base sheet 149 and the outer edge side base sheet 152, respectively, can be changed into any suitable shape in view of convenience in manufacturing of the base sheets etc.

FIG. 25 shows another modified example, in which a discharge portion 341 is configured by further modifying the sewn portions 154L, 154R shown in FIG. 24. The sewn portion 154R which is formed substantially along the fold line CL1 on the side of the center (namely, on right side in this example) is extended to form an extension sewn portion 154a from the fold line CL1 toward the edge portions 150a, 153a of the external extended portion 150 and the internal extended portion 153 up to the sewn portion 156 of the connecting member 164. In other words, the external extended portion 150 and the internal extended portion 153 are sewn together by forming three of the sewn portion 154R, the extension sewn portion 154a and the sewn portion of the connecting member 164 in series. By sewing the external extended portion 150 and the internal extended portion 153 together in such a manner, a non-sewn portion 155a (anon-joined portion, or slit) by which a discharge port is formed when the airbag is inflated is defined between the sewn portion 156 of the connecting member 164 and an end of the sewn portion 154L. Accordingly, when the protruding portion is formed (as shown in FIG. 11B), a discharge port for discharging the inflation gas is formed only one side of the protruding portion and the other side thereof is closed by the extension sewn portion 154a. By forming the discharge port only on one side of the protruding portion, a discharging amount of the inflation gas can be easily adjusted in accordance with the dimension of the non-sewn portion 155a, and accurate opening or closing of the discharge port is realized.

In the cases of the modified examples shown in FIGS. 23, 24 and 25, the connecting member 164 is provided one and is disposed within the bag main body 34 with its longitudinal direction made to be inclined with the front and rear direction which intersects the fold line CL1. The connecting member 164 is formed separately from the bag main body 134 and is made of a flexible belt-like fabric material. In the case of the modified examples, the connecting member 164 is formed into a tapered shape in which the bottom portion 164a side is widened, while the tip end side is narrowed and is configured to have the loop portion provided on the tip end side thereof through which the locking pin of the locking member located substantially at the center in the traverse direction can be passed. The connecting member 164 is sewn together with the external extended portion 150 and the internal extended portion 153 by the sewn portion 156 with the bottom portion 164a side held between the edge portions 150a, 153a of the external extended portion 150 and the internal extended portion 153. In addition, the connecting member 164 is provided in the back main body 134 in such a manner as to make its longitudinal direction to follow substantially the longitudinal direction so that the loop portion lying on the tip end side is made to protrude from the passage hole with the bottom portion 164a side sewn to the external extended portion 150 and the internal extended portion 153 in the location of the sewn portion 156. This connecting member 164 is such as to be folded and accommodated together with the bag main body 134, and the locking pin is passed through the loop portion, which is provided on the bottom end side when the connecting member 164 is folded and accommodated, so that the loop portion is locked on the locking member. In addition, in the case of the modified examples, the connecting member 164 is set to such a length dimension that the air bag 133 is allowed to complete its inflation without any problem even when the air bag 133 inflates in such a manner that the protruding portion of the discharge portion 141,241 is withdrawn into the bag main body 134 with the connection of the loop portion with the locking pin maintained.

The formation of the extension sewn portion 154a as shown in FIG. 25 is applicable to the first embodiment. Namely, in FIG. 12, an extension sewn portion may be formed between the sewn portion 54R and the sewn portion 56 of the connecting member 56. According to such sewing configuration, the discharge port for discharging the inflation gas is formed only one side of the protrusion portion 42 and the other side thereof is closed by the extension sewn portion, when the air bag is inflated. Accordingly, the same advantages can be accomplished as those in the example of FIG. 25.

What is claimed is:

1. An air bag system comprising:
   an air bag accommodated within an accommodating portion; and
   an opening and closing control unit of a discharge port disposed on the accommodating portion, wherein
   the air bag includes a bag main body having an inlet opening, a discharge portion having the discharge port, and a connecting member disposed within the bag main body such that a first end thereof is connected to the discharge portion and a second end thereof is connected to the opening and closing control unit, the air bag is inflated by introducing a gas into an interior of the air bag through the inlet opening and discharges a part of the gas by opening the discharge port;

the bag main body is formed by joining circumferential edges of a plurality of main body base sheets to each other, the discharge portion includes a pair of extended portions extended from the main body base sheets, the extended including respective tip ends and foot portions located separately from the tip ends, the extended portions are connected to the first end of the connecting member, and a slit for forming the discharge port is located at the foot portions of the respective extended portions, and is formed as a non-joined portion along a seaming line joining the circumferential edges of the main body base sheets, when the air bag is accommodated in the accommodating portion, the extended portions are superposed and accommodated in the interior of the air bag, and when the air bag is inflated, the slit for the discharge port is closed by maintaining the second end of the connecting member to be connected to the opening and closing control unit, and subsequently, at least a part of the discharge portion protrudes to an exterior of the air bag to thereby cause the slit to be opened to form the discharge port, by releasing connection of the second end of the connecting member to the opening and control unit to cancel a drawing tension of the connecting member to the discharge portion in the interior of the air bag.

2. An air bag system according to claim 1, wherein when the air bag is inflated with the connection of the connecting member to the opening and closing control unit maintained, the extended portions forming the slit on the foot portion sides thereof are brought into pressure contact with each other by virtue of an internal pressure produced within the air bag by the gas introduced thereinto so as to maintain the discharge port closed.

3. An air bag system according to claim 1, wherein when the air bag has completed its inflation with the discharge portion closed, portions of the main body base sheets making up the bag main body which lie in the vicinity of the discharge portion are disposed in an area which is formed into a shape of curved surface which protrudes towards an outer circumference of an inflated shape defined in a direction which intersects a straight line connecting the seaming line substantially at right angles.

4. An air bag system according to claim 1, wherein one connecting member is provided so that the tip ends of the two extended portions are both connected thereto.

5. An air bag system as set forth in claim 1, wherein two connecting members are provided so that the tip ends of the two extended portions are connected thereto, respectively.

6. An air bag system as set forth in claim 1, wherein the air bag is used in an air bag system for a steering wheel.

7. An air bag system as set forth in claim 1, wherein the air bag is used in a front seat passenger air bag.

* * * * *